US012002432B2

(12) United States Patent
Suzaki

(10) Patent No.: US 12,002,432 B2
(45) Date of Patent: Jun. 4, 2024

(54) INFORMATION PROCESSING METHOD, INFORMATION PROCESSING PROGRAM, INFORMATION PROCESSING DEVICE, AND IMAGE DISPLAY DEVICE

(71) Applicant: NICHIA CORPORATION, Anan (JP)

(72) Inventor: Kohei Suzaki, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/303,400

(22) Filed: May 27, 2021

(65) Prior Publication Data

US 2021/0375220 A1 Dec. 2, 2021

(30) Foreign Application Priority Data

May 29, 2020 (JP) ................................ 2020-095050
Aug. 31, 2020 (JP) ................................ 2020-146341

(51) Int. Cl.
*G09G 3/34* (2006.01)
*G09G 3/36* (2006.01)

(52) U.S. Cl.
CPC ............ *G09G 3/3426* (2013.01); *G09G 3/36* (2013.01); *G09G 2300/0842* (2013.01); *G09G 2320/0626* (2013.01); *G09G 2360/16* (2013.01)

(58) Field of Classification Search
CPC .................. G09G 3/3426; G09G 3/36; G09G 2300/0842; G09G 2320/0626; G09G 2360/16
See application file for complete search history.

(56) References Cited

U.S. PATENT DOCUMENTS 5,739,871 A * 4/1998 Kim ......................... H04N 5/20 348/E5.073
2009/0140975 A1* 6/2009 Nonaka ............... G09G 3/3426 345/102
2010/0053066 A1* 3/2010 Nonaka ............... G09G 3/3648 345/102
2011/0057961 A1* 3/2011 Tsuru ..................... G09G 3/342 345/89
2012/0105509 A1* 5/2012 Ito ....................... G09G 3/3426 345/690
2015/0109351 A1 4/2015 Harada et al.
2018/0157121 A1* 6/2018 Matsuura .......... G02F 1/133611
2020/0074941 A1* 3/2020 Takahashi ................ G09G 3/36
2020/0193167 A1* 6/2020 Uema .................... G06V 20/53
2020/0248890 A1* 8/2020 Osaka .................. G02B 3/0056

FOREIGN PATENT DOCUMENTS

JP H10173942 A 6/1998
JP 2000207540 A 7/2000
JP 2001027702 A 1/2001
(Continued)

*Primary Examiner* — Matthew A Eason
*Assistant Examiner* — Sujit Shah
(74) *Attorney, Agent, or Firm* — Hunton Andrews Kurth LLP

(57) ABSTRACT

An information processing method, including: generating second luminance profile data by inputting first luminance profile data of a spreading of light when one light source of a backlight device including at least one light source is lit, and adjusting a thin-out spacing according to positions in a luminance distribution based on the first luminance profile data. Values of the first luminance profile data are thinned in the second luminance profile data.

7 Claims, 20 Drawing Sheets

(56) References Cited

FOREIGN PATENT DOCUMENTS

| | | | |
|---|---|---|---|
| JP | 4131049 | B2 | 8/2008 |
| JP | 4193387 | B2 | 12/2008 |
| JP | 2010054839 | A | 3/2010 |
| JP | 2012002862 | A | 1/2012 |
| JP | 2012068655 | A | 4/2012 |
| JP | 2015082023 | A | 4/2015 |
| JP | 2015108795 | A | 6/2015 |
| JP | 2018054683 | A | 4/2018 |
| JP | 2018055079 | A | 4/2018 |
| JP | 2019040135 | A | 3/2019 |

* cited by examiner

| | | | | | | | | | | | | | | | | | | | | |
|---|---|---|---|---|---|---|---|---|---|---|---|---|---|---|---|---|---|---|---|---|
| 0 | 0 | 0 | 0 | 0 | 0 | 0 | 0 | 0 | 0 | 0.8 | 0 | 0 | 0 | 0 | 0 | 0 | 0 | 0 | 0 | 0 |
| 0 | 0 | 0 | 0 | 0 | 0 | 0 | 0 | 0.9 | 1.5 | 1.5 | 1.5 | 0.9 | 0 | 0 | 0 | 0 | 0 | 0 | 0 | 0 |
| 0 | 0 | 0 | 0 | 0 | 0 | 0 | 0 | 1.8 | 2.4 | 2.4 | 2.4 | 1.8 | 0 | 0 | 0 | 0 | 0 | 0 | 0 | 0 |
| 0 | 0 | 0 | 0 | 0 | 0 | 0 | 0.4 | 4.1 | 4.7 | 4.8 | 4.7 | 4.1 | 0.4 | 0 | 0 | 0 | 0 | 0 | 0 | 0 |
| 0 | 0 | 0 | 0 | 0 | 0 | 0 | 3.6 | 7.4 | 8 | 8.1 | 8 | 7.4 | 3.6 | 0 | 0 | 0 | 0 | 0 | 0 | 0 |
| 0 | 0 | 0 | 0 | 0 | 0 | 0 | 12 | 16 | 17 | 17 | 17 | 16 | 12 | 0 | 0 | 0 | 0 | 0 | 0 | 0 |
| 0 | 0 | 0 | 0 | 0 | 0 | 1.8 | 25 | 30 | 31 | 31 | 31 | 30 | 25 | 1.8 | 0 | 0 | 0 | 0 | 0 | 0 |
| 0 | 0 | 0 | 0.4 | 3.6 | 12 | 25 | 59 | 69 | 71 | 71 | 71 | 69 | 59 | 25 | 12 | 3.6 | 0.4 | 0 | 0 | 0 |
| 0 | 0.9 | 1.8 | 4.1 | 7.4 | 16 | 30 | 69 | 84 | 89 | 89 | 89 | 84 | 69 | 30 | 16 | 7.4 | 4.1 | 1.8 | 0.9 | 0 |
| 0 | 1.5 | 2.4 | 4.7 | 8 | 17 | 31 | 71 | 89 | 96 | 97 | 96 | 89 | 71 | 31 | 17 | 8 | 4.7 | 2.4 | 1.5 | 0 |
| 0.8 | 1.5 | 2.4 | 4.8 | 8.1 | 17 | 31 | 71 | 89 | 97 | 100 | 97 | 89 | 71 | 31 | 17 | 8.1 | 4.8 | 2.4 | 1.5 | 0.8 |
| 0 | 1.5 | 2.4 | 4.7 | 8 | 17 | 31 | 71 | 89 | 96 | 97 | 96 | 89 | 71 | 31 | 17 | 8 | 4.7 | 2.4 | 1.5 | 0 |
| 0 | 0.9 | 1.8 | 4.1 | 7.4 | 16 | 30 | 69 | 84 | 89 | 89 | 89 | 84 | 69 | 30 | 16 | 7.4 | 4.1 | 1.8 | 0.9 | 0 |
| 0 | 0 | 0 | 0.4 | 3.6 | 12 | 25 | 59 | 69 | 71 | 71 | 71 | 69 | 59 | 25 | 12 | 3.6 | 0.4 | 0 | 0 | 0 |
| 0 | 0 | 0 | 0 | 0 | 0 | 1.8 | 25 | 30 | 31 | 31 | 31 | 30 | 25 | 1.8 | 0 | 0 | 0 | 0 | 0 | 0 |
| 0 | 0 | 0 | 0 | 0 | 0 | 0 | 12 | 16 | 17 | 17 | 17 | 16 | 12 | 0 | 0 | 0 | 0 | 0 | 0 | 0 |
| 0 | 0 | 0 | 0 | 0 | 0 | 0 | 3.6 | 7.4 | 8 | 8.1 | 8 | 7.4 | 3.6 | 0 | 0 | 0 | 0 | 0 | 0 | 0 |
| 0 | 0 | 0 | 0 | 0 | 0 | 0 | 0.4 | 4.1 | 4.7 | 4.8 | 4.7 | 4.1 | 0.4 | 0 | 0 | 0 | 0 | 0 | 0 | 0 |
| 0 | 0 | 0 | 0 | 0 | 0 | 0 | 0 | 1.8 | 2.4 | 2.4 | 2.4 | 1.8 | 0 | 0 | 0 | 0 | 0 | 0 | 0 | 0 |
| 0 | 0 | 0 | 0 | 0 | 0 | 0 | 0 | 0.9 | 1.5 | 1.5 | 1.5 | 0.9 | 0 | 0 | 0 | 0 | 0 | 0 | 0 | 0 |
| 0 | 0 | 0 | 0 | 0 | 0 | 0 | 0 | 0 | 0 | 0.8 | 0 | 0 | 0 | 0 | 0 | 0 | 0 | 0 | 0 | 0 |

200

FIG. 4

| | | | | | | | | | | | | | | | | | | | | |
|---|---|---|---|---|---|---|---|---|---|---|---|---|---|---|---|---|---|---|---|---|
| | | | | | | 0 | | 0 | | 0.8 | | 0 | | 0 | | | | | | |
| | | | | | | | | | | | | | | | | | | | | |
| | | 0 | | | | 0 | | 1.8 | | 2.4 | | 1.8 | | 0 | | | | 0 | | |
| | | | | | | | | | | | | | | | | | | | | |
| | | | | | | 0 | | 7.4 | | 8.1 | | 7.4 | | 0 | | | | | | |
| | | | | | 0 | 0 | 12 | 16 | 17 | 17 | 17 | 16 | 12 | 0 | 0 | | | | | |
| 0 | | 0 | | 0 | 0 | 1.8 | 25 | 30 | 31 | 31 | 31 | 30 | 25 | 1.8 | 0 | 0 | | 0 | | 0 |
| | | | | | 12 | 25 | 59 | 69 | 71 | 71 | 71 | 69 | 59 | 25 | 12 | | | | | |
| 0 | | 1.8 | | 7.4 | 16 | 30 | 69 | 84 | | 89 | | 84 | 69 | 30 | 16 | 7.4 | | 1.8 | | 0 |
| | | | | | 17 | 31 | 71 | | 96 | | 96 | | 71 | 31 | 17 | | | | | |
| 0.8 | | 2.4 | | 8.1 | 17 | 31 | 71 | 89 | | 100 | | 89 | 71 | 31 | 17 | 8.1 | | 2.4 | | 0.8 |
| | | | | | 17 | 31 | 71 | | 96 | | 96 | | 71 | 31 | 17 | | | | | |
| 0 | | 1.8 | | 7.4 | 16 | 30 | 69 | 84 | | 89 | | 84 | 69 | 30 | 16 | 7.4 | | 1.8 | | 0 |
| | | | | | 12 | 25 | 59 | 69 | 71 | 71 | 71 | 69 | 59 | 25 | 12 | | | | | |
| 0 | | 0 | | 0 | 0 | 1.8 | 25 | 30 | 31 | 31 | 31 | 30 | 25 | 1.8 | 0 | 0 | | 0 | | 0 |
| | | | | | 0 | 0 | 12 | 16 | 17 | 17 | 17 | 16 | 12 | 0 | 0 | | | | | |
| | | | | | | 0 | | 7.4 | | 8.1 | | 7.4 | | 0 | | | | | | |
| | | | | | | | | | | | | | | | | | | | | |
| | | 0 | | | | 0 | | 1.8 | | 2.4 | | 1.8 | | 0 | | | | 0 | | |
| | | | | | | | | | | | | | | | | | | | | |
| | | | | | | 0 | | 0 | | 0.8 | | 0 | | 0 | | | | | | |

450

FIG. 10

| | | | | | | | | | | | | | | | | | | | | |
|---|---|---|---|---|---|---|---|---|---|---|---|---|---|---|---|---|---|---|---|---|
| 0 | 0 | 0 | 0 | 0 | 0 | 0 | 0 | 0 | 0.4 | 0.8 | 0.4 | 0 | 0 | 0 | 0 | 0 | 0 | 0 | 0 | 0 |
| 0 | 0 | 0 | 0 | 0 | 0 | 0 | 0.4 | 0.9 | 1.3 | 1.6 | 1.3 | 0.9 | 0.4 | 0 | 0 | 0 | 0 | 0 | 0 | 0 |
| 0 | 0 | 0 | 0 | 0 | 0 | 0 | 0.9 | 1.8 | 2.1 | 2.4 | 2.1 | 1.8 | 0.9 | 0 | 0 | 0 | 0 | 0 | 0 | 0 |
| 0 | 0 | 0 | 0 | 0 | 0 | 0 | 2.3 | 4.6 | 4.9 | 5.2 | 4.9 | 4.6 | 2.3 | 0 | 0 | 0 | 0 | 0 | 0 | 0 |
| 0 | 0 | 0 | 0 | 0 | 0 | 0 | 6.4 | 7.4 | 11 | 8.1 | 11 | 7.4 | 6.4 | 0 | 0 | 0 | 0 | 0 | 0 | 0 |
| 0 | 0 | 0 | 0 | 0 | 0 | 3.4 | 12 | 16 | 17 | 18 | 17 | 16 | 12 | 3.4 | 0 | 0 | 0 | 0 | 0 | 0 |
| 0 | 0 | 0 | 0 | 0 | 3.4 | 1.8 | 26 | 30 | 37 | 31 | 37 | 30 | 26 | 1.8 | 3.4 | 0 | 0 | 0 | 0 | 0 |
| 0 | 0.4 | 0.9 | 2.3 | 6.4 | 12 | 26 | 59 | 67 | 71 | 73 | 71 | 67 | 59 | 26 | 12 | 6.4 | 2.3 | 0.9 | 0.4 | 0 |
| 0 | 0.9 | 1.8 | 4.6 | 7.4 | 16 | 30 | 67 | 84 | 89 | 89 | 89 | 84 | 67 | 30 | 16 | 7.4 | 4.6 | 1.8 | 0.9 | 0 |
| 0.4 | 1.3 | 2.1 | 4.9 | 11 | 17 | 37 | 71 | 89 | 96 | 97 | 96 | 89 | 71 | 37 | 17 | 11 | 4.9 | 2.1 | 1.3 | 0.4 |
| 0.8 | 1.6 | 2.4 | 5.2 | 8.1 | 18 | 31 | 73 | 89 | 97 | 100 | 97 | 89 | 73 | 31 | 18 | 8.1 | 5.2 | 2.4 | 1.6 | 0.8 |
| 0.4 | 1.3 | 2.1 | 4.9 | 11 | 17 | 37 | 71 | 89 | 96 | 97 | 96 | 89 | 71 | 37 | 17 | 11 | 4.9 | 2.1 | 1.3 | 0.4 |
| 0 | 0.9 | 1.8 | 4.6 | 7.4 | 16 | 30 | 67 | 84 | 89 | 89 | 89 | 84 | 67 | 30 | 16 | 7.4 | 4.6 | 1.8 | 0.9 | 0 |
| 0 | 0.4 | 0.9 | 2.3 | 6.4 | 12 | 26 | 59 | 67 | 71 | 73 | 71 | 67 | 59 | 26 | 12 | 6.4 | 2.3 | 0.9 | 0.4 | 0 |
| 0 | 0 | 0 | 0 | 3.9 | 3.4 | 1.8 | 26 | 30 | 37 | 31 | 37 | 30 | 26 | 1.8 | 3.4 | 0 | 0 | 0 | 0 | 0 |
| 0 | 0 | 0 | 0 | 0 | 0 | 3.4 | 12 | 16 | 17 | 18 | 17 | 16 | 12 | 3.4 | 0 | 0 | 0 | 0 | 0 | 0 |
| 0 | 0 | 0 | 0 | 0 | 0 | 0 | 6.4 | 7.4 | 11 | 8.1 | 11 | 7.4 | 6.4 | 0 | 0 | 0 | 0 | 0 | 0 | 0 |
| 0 | 0 | 0 | 0 | 0 | 0 | 0 | 2.3 | 4.6 | 4.9 | 5.2 | 4.9 | 4.6 | 2.3 | 0 | 0 | 0 | 0 | 0 | 0 | 0 |
| 0 | 0 | 0 | 0 | 0 | 0 | 0 | 0.9 | 1.8 | 2.1 | 2.4 | 2.1 | 1.8 | 0.9 | 0 | 0 | 0 | 0 | 0 | 0 | 0 |
| 0 | 0 | 0 | 0 | 0 | 0 | 0 | 0.4 | 0.9 | 1.3 | 1.6 | 1.3 | 0.9 | 0.4 | 0 | 0 | 0 | 0 | 0 | 0 | 0 |
| 0 | 0 | 0 | 0 | 0 | 0 | 0 | 0 | 0 | 0.4 | 0.8 | 0.4 | 0 | 0 | 0 | 0 | 0 | 0 | 0 | 0 | 0 |

FIG. 11

INFORMATION PROCESSING METHOD, INFORMATION PROCESSING PROGRAM, INFORMATION PROCESSING DEVICE, AND IMAGE DISPLAY DEVICE

CROSS-REFERENCE TO RELATED APPLICATIONS

This application claims priority to Japanese Patent Application No. 2020-095050, filed on May 29, 2020, and Japanese Patent Application No. 2020-146341, filed on Aug. 31, 2020, the disclosures of all of which are hereby incorporated by reference in their entirety.

BACKGROUND

The disclosure relates to an information processing method, an information processing program, an information processing device, and an image display device.

An image display device that uses a liquid crystal panel and a backlight device including a plurality of light sources can display a high contrast image with low power consumption by controlling the displayed image and the brightness of the light sources.

In an image display device described in JP-A 2010-54839, the illuminance distribution of each light source is estimated for each position in the irradiation object from the illuminance distribution of the light source and the modulation index of the light emission luminance for each light source.

SUMMARY

Luminance profile data that is referred to when performing a luminance distribution calculation of an entirety of the backlight device must exactly reproduce the luminance distribution of the irradiated light from the light source, and is desired to be reduced in the data amount as much as possible while obtaining a luminance distribution calculation result that is as precise as that when having a large data amount. It is possible to reduce the data amount by simple thinning, reduction, etc., of the data; however, there are cases where simple thinning and/or deletion undesirably deletes luminance profile data of characteristic portions such as differences according to position within the luminance distribution and the like.

Therefore, one object of the present disclosure is to provide an information processing method that generates new luminance profile data by reducing a data amount from the values of original luminance profile data while keeping the features of the original luminance profile data.

Another object of the present disclosure is to provide an information processing program that generates second luminance profile data by using such an information processing method.

Still another object of the present disclosure is to provide an information processing device configured to calculate a luminance distribution of an entirety of the backlight device by using such an information processing method or program to generate second luminance profile data.

Yet another object of the present disclosure is to provide such an information processing method, an information processing program, an information processing device, and an image display device.

An information processing method according to an embodiment of the present disclosure includes inputting first luminance profile data of spreading of light when one light source of a backlight device including at least one light source is lit; and thinning values of the first luminance profile data with adjustment of a thin-out spacing according to positions in a luminance distribution of the at least one light source based on the first luminance profile data to generate second luminance profile data.

An information processing program according to an embodiment of the present disclosure includes causing a computer to generate second luminance profile data using the information processing method described in the present disclosure.

An information processing device according to an embodiment of the present disclosure includes a memory element storing second luminance profile data generated by the information processing method described in the present disclosure, and a luminance distribution calculator configured to calculate a luminance distribution of an entirety of the backlight device when one or more light sources arranged in a backlight device are lit at respective positions and with respective light output levels of the one or more light sources, the calculating being performed with reference to values of the second luminance profile data stored in the memory element.

An information processing device according to an embodiment of the present disclosure includes a first memory element storing first luminance profile data, the first luminance profile data being of spreading of light when one light source of one or more light sources of a backlight device is lit; an information processor configured to generate second luminance profile data from values of the first luminance profile data using the information processing method described in the present disclosure; a second memory element storing the second luminance profile data; and a luminance distribution calculator configured to calculate a luminance distribution of an entirety of the backlight device when the one or more light sources arranged in the backlight device is lit at respective positions and with respective light output levels of the one or more light sources, the calculating being performed with reference to values of the second luminance profile data stored in the second memory element.

An image display device according to an embodiment of the present disclosure includes a backlight device including one or more light sources; a backlight device controller configured to control a brightness of the one or more light sources; a liquid crystal panel configured to display an image; a liquid crystal panel controller configured to control transmittances of pixels of the liquid crystal panel; a light output level calculator configured to calculate a light output level of each of the one or more light sources from image data; a luminance distribution calculator configured to calculate luminance distribution data at each position of the one or more light sources from the second luminance profile data and the light output levels; and an image processor configured to calculate transmittances of the pixels of the liquid crystal panel from a result of the calculation by the luminance distribution calculator. The luminance distribution calculator may be the information processing device described in the present disclosure.

With an information processing method according to one embodiment of the present disclosure, luminance profile data that has a smaller data amount than original luminance profile data can be generated while maintaining the precision of a luminance distribution calculation result.

An information processing method configured to generate new luminance profile data having a reduced data amount from values of original luminance profile data while maintaining the features of the original luminance profile data can be provided, and an information processing program, an information processing device, and an image display device that use the information processing method can be provided.

BRIEF DESCRIPTION OF THE DRAWINGS

In FIG. 1B, an optical material is disposed between a light source for a backlight device and a liquid crystal panel in addition to FIG. 1A.

FIG. 2A is a schematic top view illustrating a position of the light source. FIG. 2B is a mapping diagram of a luminance in each section in the luminance profile data of the light source expressed as a percentage with a maximum value as 100. FIG. 2C is a graph illustrating a luminance variation of one line of the sections in FIG. 2B.

FIG. 4 is a schematic view of the luminance profile data to explain a thinning processing according to one embodiment of the present disclosure, and is a mapping diagram illustrating a luminance profile data before the thinning processing.

FIG. 10 is a mapping diagram to explain an interpolation method of the luminance profile in the information processing device according to an exemplary embodiment of the present disclosure, and a mapping diagram illustrating a luminance profile data before an interpolation.

FIG. 11 is a mapping diagram illustrating a luminance profile data after the interpolation.

FIG. 17A is a schematic circuit diagram illustrating a light source and a current that flows in the light source. FIG. 17B is a graph illustrating a temporal waveform of the current that flows in the light source.

DETAILED DESCRIPTION OF EMBODIMENTS

Figure 1A:
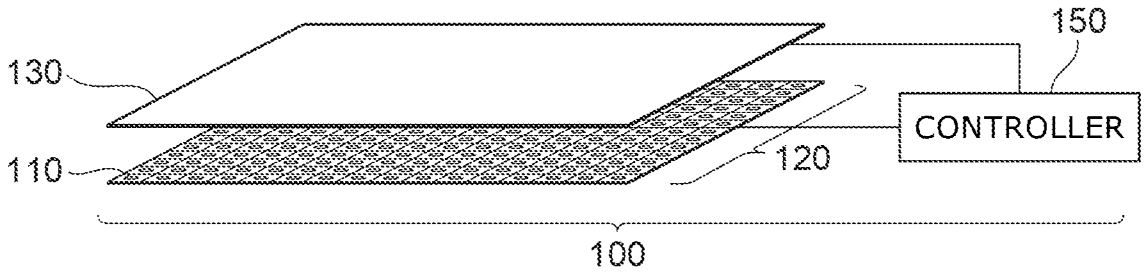
FIGS. 1A and 1B are schematic perspective views illustrating aspects of an image display device.

Certain embodiments of the present disclosure will be described in detail based on the drawings. In the description hereinbelow, terms that indicate designated directions and/or positions (e.g., "center", "horizontal", "perpendicular", "oblique", "up", "down", and other terms including such terms) are used as necessary. Such terms are used for easier understanding of the present disclosure when referring to the drawings; the technical scope of the present disclosure is not limited by the meaning of such terms. Portions designated with the same reference numeral in a plurality of drawings are the same portion or member.

Image Display Device

Figure 1B:
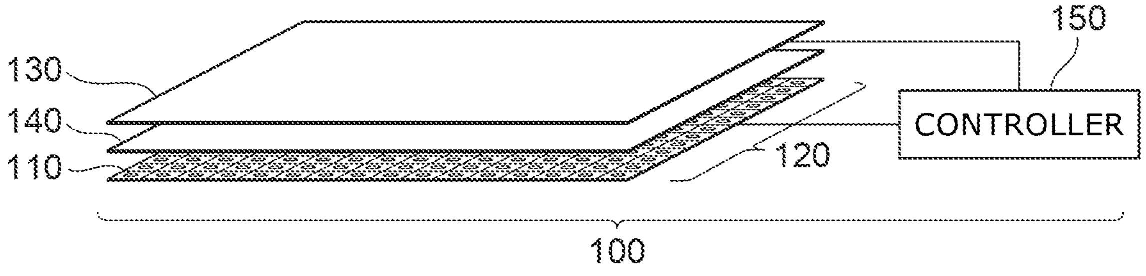

FIGS. 1A and 1B are schematic views illustrating aspects of an image display device according to an embodiment. That is, these drawings are schematic views illustrating an example of an image display device 100 that combines a controller, a liquid crystal panel, and a backlight device including a light source.

The image display device 100 may include a liquid crystal panel 130 and a backlight device 120. Any image is displayed in the image display device 100 by irradiating the light of the backlight device 120 onto the liquid crystal panel 130 and by controlling the transmittances of pixels of the liquid crystal panel 130. The brightness of the backlight device 120 and/or the transmittance of each pixel of the liquid crystal panel 130 are controlled by a controller 150.

FIGS. 1A and 1B are schematic perspective views illustrating aspects of the image display device.

The aspect illustrated in FIG. 1A includes the controller 150, the liquid crystal panel 130, and the backlight device 120 in which a plurality of light sources 110 are arranged in a plane.

In the aspect illustrated in FIG. 1B, an optical material 140 is included between the backlight device 120 and the liquid crystal panel 130 in addition to FIG. 1A. A single optical material 140 or a plurality of the optical materials 140 may be employed.

A control method and an information processing method that are performed by the image display device 100 will now be described.

Backlight Device

"Backlight device" in the present specification may refer to the backlight device 120 as in FIG. 1A singly, or may refer to a combination of the backlight device 120 and the optical material 140 as in FIG. 1B. For example, a light-diffusing sheet, a light-diffusing plate, a lens sheet, etc., are examples of the optical material 140.

Luminance Profile Data

In the present embodiment, the luminance distribution of the light irradiated on the sections (the pixels) of an image display element such as a liquid crystal panel or the like when one light source of a backlight device in which at least one light source is arranged in a plane is lit and the light is irradiated on the image display element is called a "luminance profile". The numerical data of the luminance profile will be referred to as "luminance profile data". A single light source of the backlight device includes at least one light-emitting element. More specifically, the single light source may include a single light-emitting element, a plurality of light-emitting elements, an LED package or a chip size package (csp) that includes a single light-emitting element or a plurality of light-emitting elements, any one of these components covered with a member such as a resin, or the like.

Figure 2A:
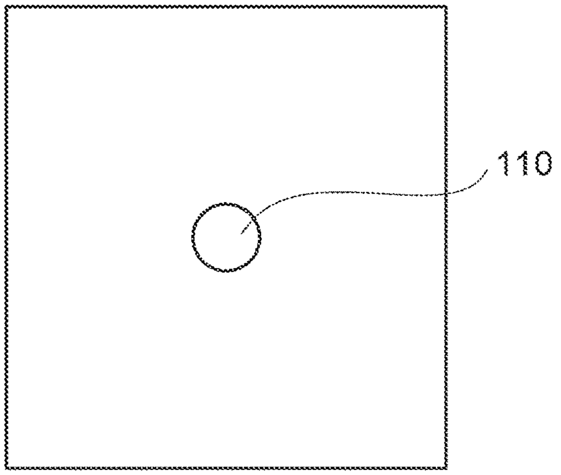
FIGS. 2A to 2C are schematic views illustrating aspects of a luminance profile data when one light source is lit.
Figure 2B:
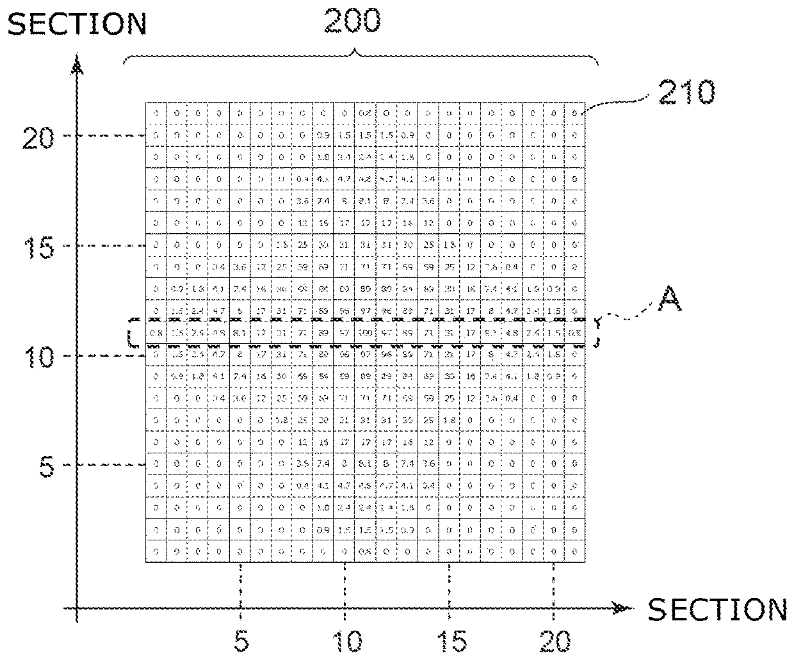
Figure 2C:
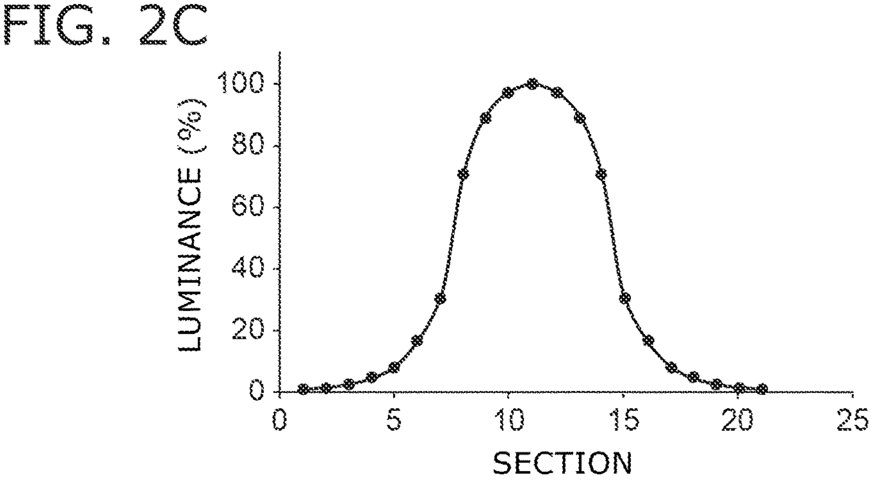

FIGS. 2A to 2C are schematic views for describing the luminance profile data. FIG. 2A is a schematic top view illustrating the position of a single light source 110 of the backlight device. FIG. 2B illustrates an example of luminance profile data 200 when only a light source 110 at or near the center of the plurality of light sources 110 is lit as the single light source of the backlight device. The luminance profile data 200 is divided into a plurality of sections 210. A single section 210 represents a single pixel of the image display element. The numerical values notated inside the sections 210 represent the relative intensity of the luminance of the irradiated light for the pixels of the image display element. Although the data of 21×21 sections is illustrated as the luminance profile data in FIG. 2B, the number of sections (the data quantity) of the luminance profile data is not limited to 21×21 sections. Although FIG. 2B shows an example of data that is isotropic vertically, laterally, and/or obliquely, the data is not necessarily isotropic data. For example, the data may be in 240×270 sections with anisotropic variation in the data values.

FIG. 2C is a graph in which the numerical values described in respective sections in region A of the luminance profile data 200 in FIG. 2B are plotted.

Luminance Distribution Calculation

When the light sources included in the backlight device are lit with their respective light output levels, light irradiated from the light sources at respective positions with respective light output levels of the light sources are superimposed, and the superimposed light is irradiated to each of the sections in the image display element. Herein, the superimposed light is referred to as the "luminance distribution of the entirety of the backlight device". The luminance distribution of the entirety of the backlight device can be estimated by a calculation from the light output level of each light source, the position information of each light source, and the luminance profile data.

First Embodiment

Figure 3:
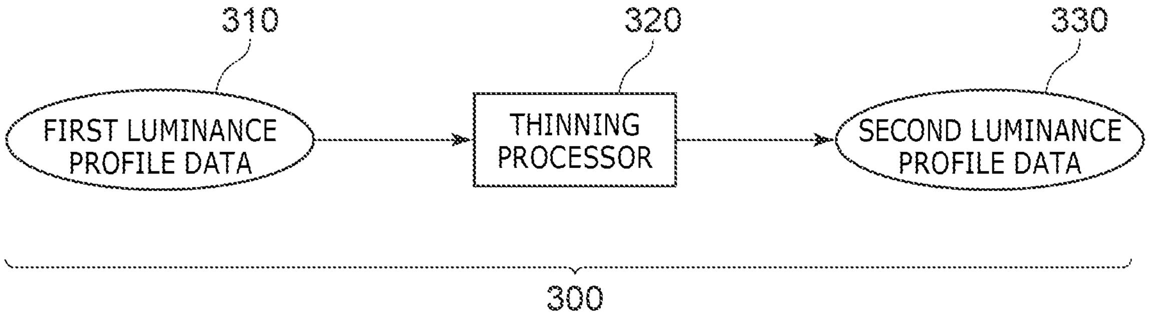
FIG. 3 is a block diagram of an information processing method according to an exemplary embodiment of the present disclosure.

FIG. 3 is a block diagram of an information processing method according to one embodiment of the present disclosure.

As shown in FIG. 3, the information processing method 300 includes a step of inputting first luminance profile data 310 to a thinning processor 320, and a step of outputting second luminance profile data 330 having undergone thinning processing by the thinning processor 320. The first luminance profile data 310 is, for example, data such as the luminance profile data 200 shown in FIG. 2B.

Thinning Processing

The thinning processing performed by the thinning processor 320 will be described using FIGS. 4 to 6.

FIG. 4 is a diagram illustrating the luminance profile data 200. The corresponding relative intensity of the luminance of the irradiated light is illustrated by a numerical value for each section.

Figure 5:
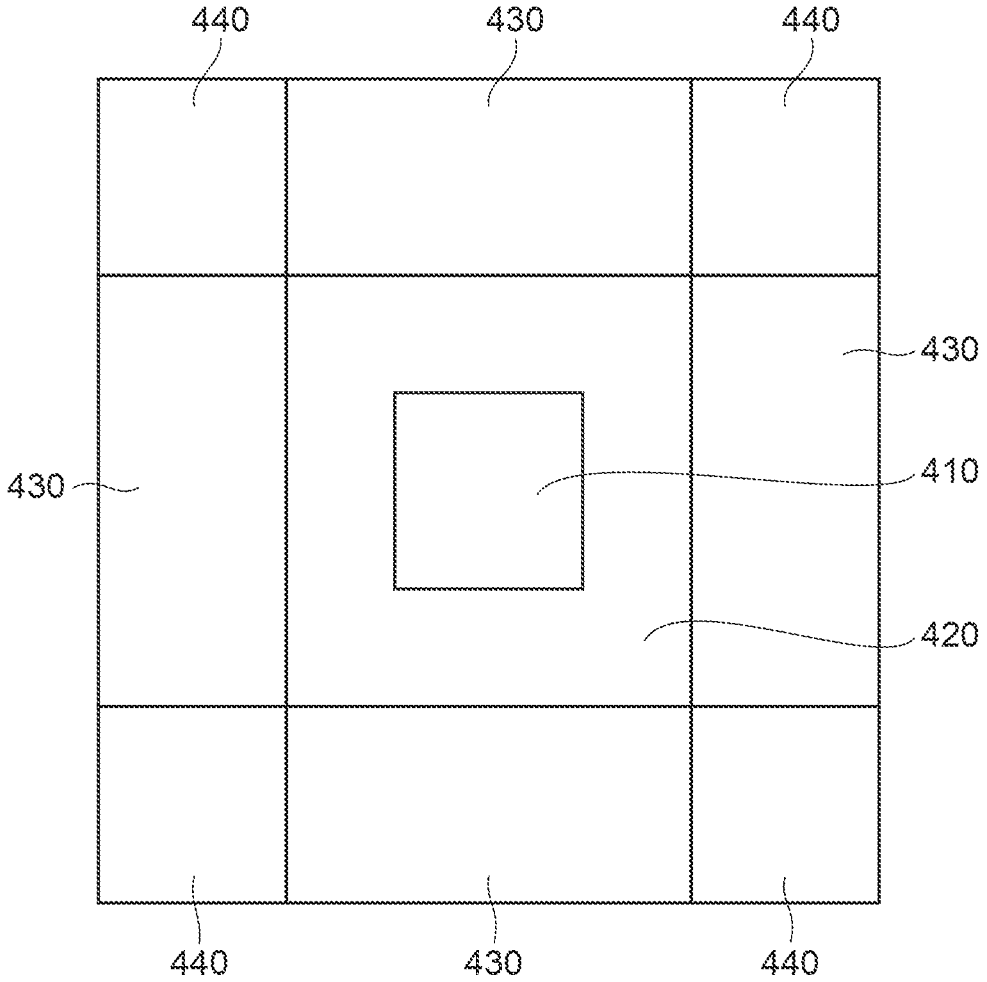
FIG. 5 is a schematic plan view illustrating a thinning processing region.

FIG. 5 is a schematic view showing division of the luminance profile data 200 into a plurality of regions according to the magnitude of the variation of the luminance. In an example herein, the luminance profile data 200 is divided into four types of regions, i.e., regions 410 to 440.

The thinning processor 320 performs thinning of the luminance profile data for each region by adjusting the thin-out spacing according to the magnitude of the spatial luminance variation of each region. In the regions in which the spatial luminance variation is large, the thin-out spacing is reduced, or thinning is not performed. The thin-out spacing is increased in the regions in which the variation of the luminance is small.

Figure 6:
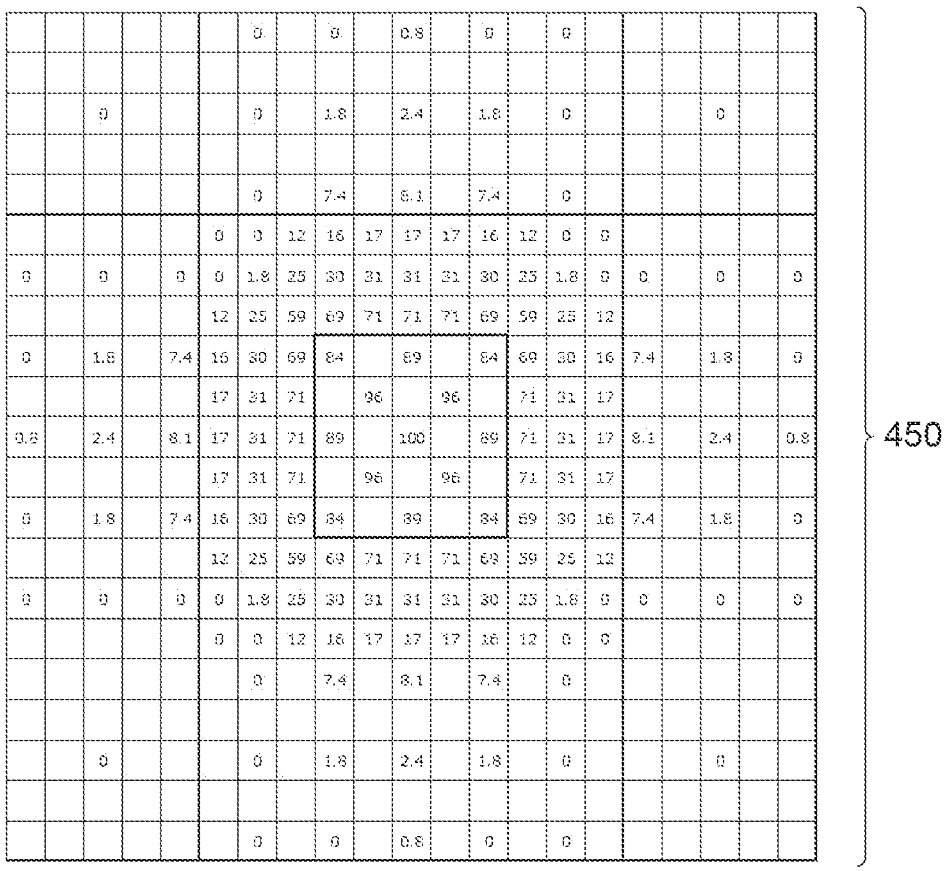
FIG. 6 is a mapping diagram illustrating a luminance profile data after the thinning processing.

FIG. 6 is a schematic diagram illustrating second luminance profile data 450 resulting from the thinning processing. It can be seen that the luminance data is appropriately thinned in each of the regions 410 to 440 according to the magnitude of the spatial variation of the luminance profile data. More specifically, when listed in order of large-to-small spatial luminance variation, the regions 410 to 440 are in the order of the region 420, the region 410, the region 430, and the region 440; and the second luminance profile data is generated so that the thin-out spacing is smallest in the region 420 and increases in the order of the region 410, the region 430, and the region 440. In the example herein, thinning is not performed in the region 420 that has the largest luminance variation. With the thinning processing, the data amount of the values of the first luminance profile data is reduced to generate second luminance profile data, while maintaining the features of the first luminance profile data. In other words, in the specification, the term "thin-out spacing" refers to spaces among the data resulting from the thinning. For example, the expression that "the thin-out spacing is small" means that the thinned amount is small and the spacing of the data having been subjected to the thinning is small.

Although the data is divided into four types of regions to simplify the description in the specific example illustrated in FIGS. 5 and 6, the types or numbers of the regions are not limited to four. In the second luminance profile data resulting from the thinning processing, the value of each of the sections in which the data is not removed in the thinning may be the value of the original first luminance profile data, or may be a value such as an average value, a median value, etc., that can be calculated from the values of several sections surrounding the section before thinning.

Second Profile Data

In second luminance profile data such as that illustrated in FIG. 6, the data does not exist in some of the sections due to removal in the thinning processing. When referencing the second luminance profile data, values of the sections in which the data is not removed are referenced as-is. For the values of the sections in which the data has been removed, the values of their respective surrounding sections in which the data is not removed may be referenced instead, or numerical values may be estimated by performing calculations such as a linear interpolation, a function interpolation, etc., from the values of the surrounding sections in which the data is not removed. Alternatively, the average value or the median value of the values of the surrounding sections in which the data is not removed may be calculated instead.

Second Embodiment

Figure 7A:
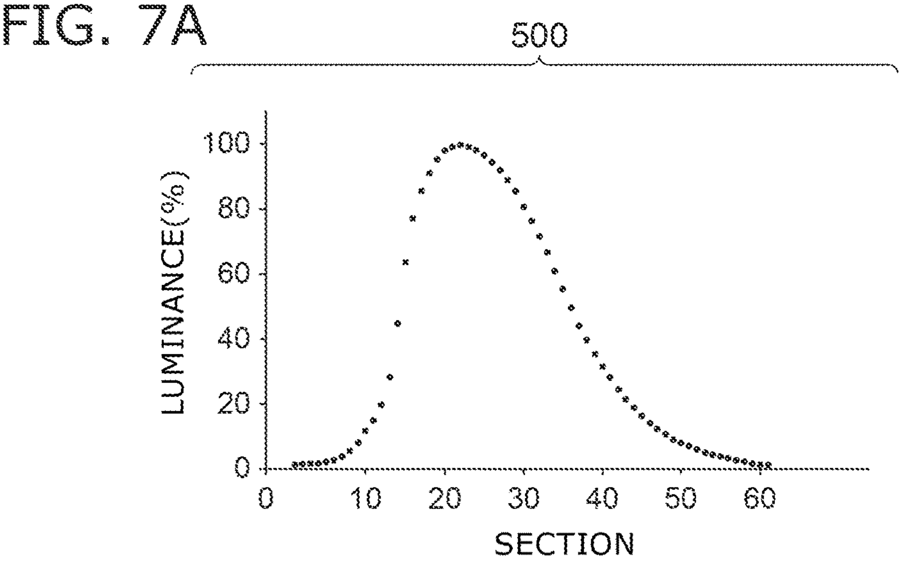
FIGS. 7A to 7C are luminance graphs illustrating the luminance variation to describe the thinning processing according to an exemplary embodiment of the present disclosure.
Figure 7B:
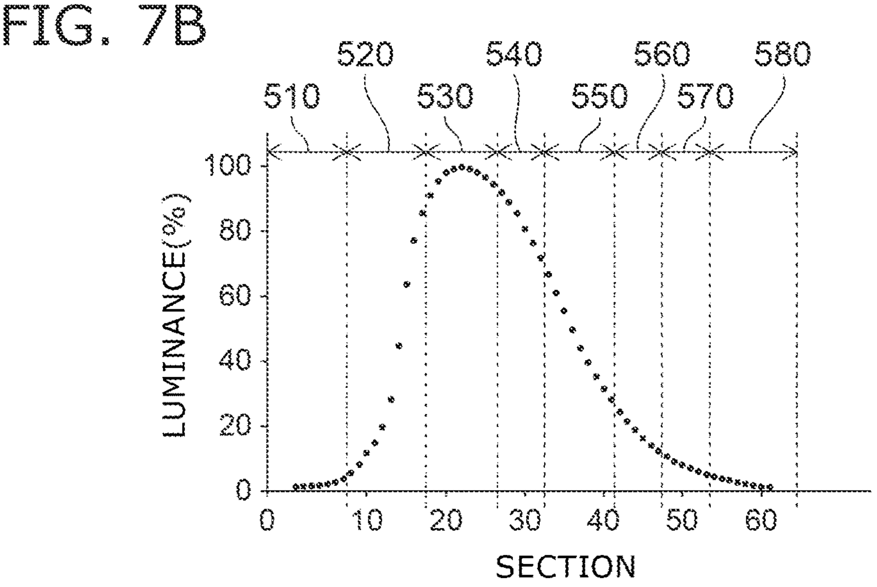
Figure 7C:
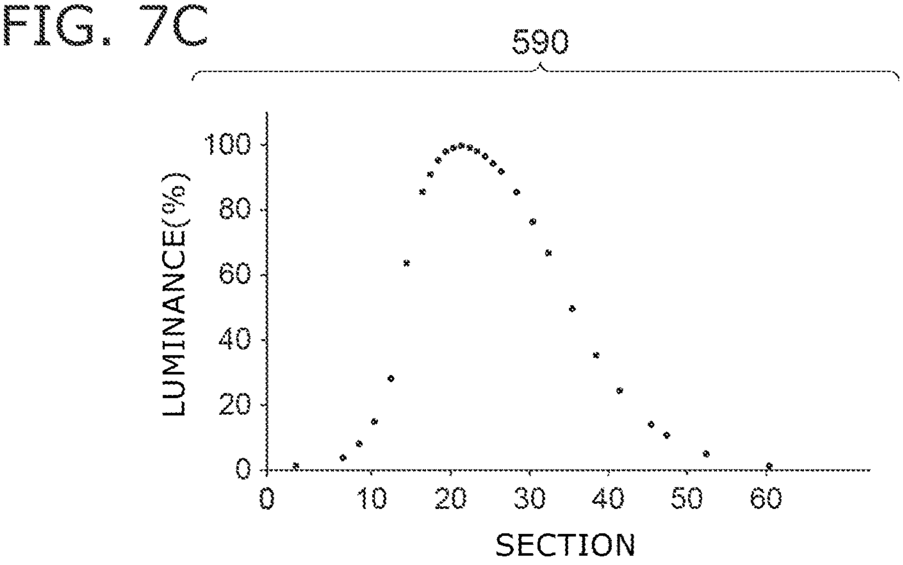

FIGS. 7A to 7C are diagrams for describing an information processing method according to a second embodiment.

The thinning processor 320 according to the second embodiment is different from the first embodiment in the method of the thinning processing. According to the second embodiment, the thinning processor 320 (referring to FIG. 3) adjusts the thin-out spacing according to the distance and the direction from the center of the luminance profile data.

A luminance graph 500 of FIG. 7A illustrates the spatial luminance variation in some direction based on the luminance profile data of 61×61 sections. In the specific example illustrated in FIG. 7B, the luminance graph 500 is divided into eight regions, i.e., regions 510 to 580, according to the distance and direction from the portion having the highest luminance. The region that includes the portion having the highest luminance is designated as the region 530. The region leftward from there (sections 1 to 17) is divided into two regions, i.e., the regions 510 and 520. The region rightward from the region 530 (sections 27 to 61) is divided into five regions, i.e., the regions 540 to 580. The thinning processor 320 performs the thinning with adjustment of the thin-out spacing for each region.

A luminance graph 590 illustrated in FIG. 7C is an example of the luminance graph after the thinning processing is performed based on the luminance graph 500. The thin-out spacing is reduced or the thinning is not performed in the region 530 that includes the portion having the highest luminance and the regions (e.g., the regions 520, 540, and 550) proximate to the region including the portion having the highest luminance. The thin-out spacing is increased in the regions (e.g., the regions 510, 580, etc.) distant to the portion having the highest luminance. In the four regions 520 to 550, the thin-out spacing may be the same among the four regions, or thinning may not be performed in the four regions. Alternatively, the thin-out spacing may be the smallest or thinning may not be performed in the region 530, and the thin-out spacing may be greater than that of the region 530 in the regions 520, 540, and 550. The division technique and the thin-out spacing of the regions may be adjusted for each direction. For example, different regions may be determined in the horizontal, perpendicular, and oblique directions from the center based on the distribution of the luminance profile; and the thin-out spacing may be adjusted for each region.

Although the data is divided into eight regions to simplify the description in the specific example illustrated in FIG. 7B, the number of regions may be other than eight. With the thinning processing, the second luminance profile data with a data amount reduced from that of the first luminance profile data can be generated based on the first luminance profile data, while maintaining the features of the first luminance profile data.

Third Embodiment

A third embodiment is a program executed by the thinning processor 320 of the information processing method according to the first or second embodiment. The program can be executed when installed in a computer. The program performs thinning processing based on the inputted first luminance profile data, and generates and outputs the second luminance profile data.

Fourth Embodiment

An information processing device according to a fourth embodiment will be described below, which is configured to calculate the luminance distribution of the entirety of the backlight device using the second profile data generated by using a thinning method as in the information processing method according to the first or second embodiment.

In the luminance distribution calculation of the entirety of the backlight device, the luminance distribution of the entirety of the backlight device is divided according to a size of a single section of the plurality of sections of the luminance profile data, and the luminance calculation is performed for each section. The luminance of a single section of the luminance distribution of the entirety of the backlight device is the summed value of the light from at least one light source. This value corresponds to the calculated value of a total of light reaching a section of the luminance distribution of the backlight device from light sources in the vicinity of the section when the light sources are lit at their respective positions with respective brightnesses according to the spreading of the light indicated by the luminance profile data.

Figure 8:
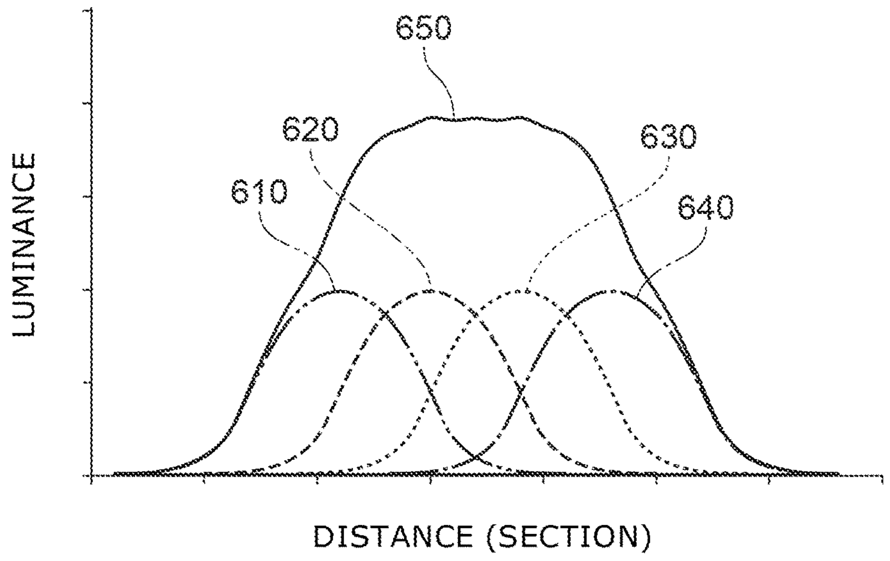
FIG. 8 is a luminance graph to explain a superposition of light when a plurality of sources are lit.

FIG. 8 is a graph illustrating an example of the spreading of light when light from a plurality of light sources is superimposed. FIG. 8 shows luminance distributions 610 to 640 each illustrating the spreading of the light from a respective one of four light sources, and a luminance distribution 650 that illustrates the spreading of a light obtained by superimposing light from the four light sources.

Figure 9:
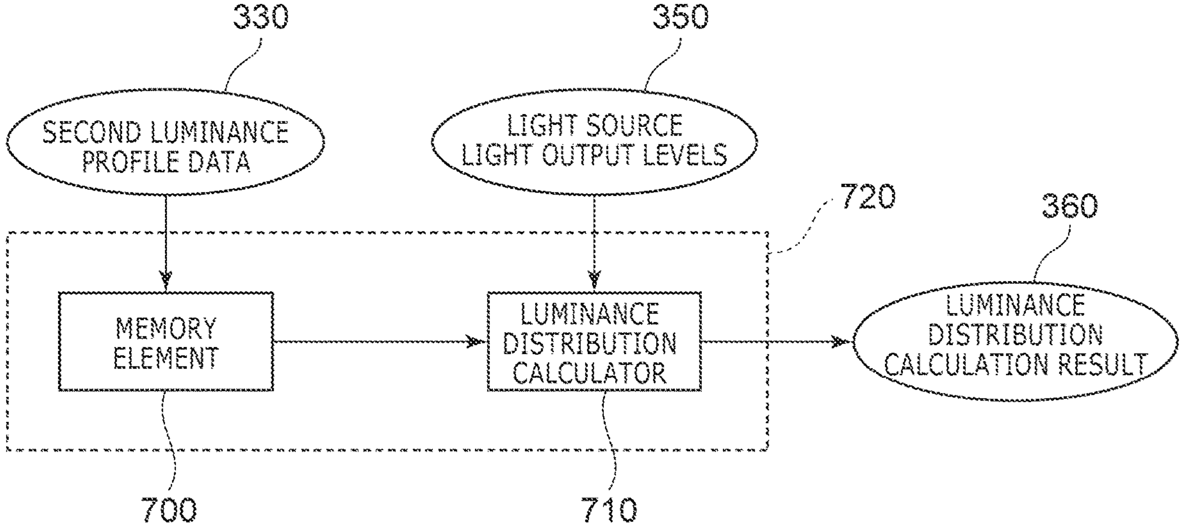
FIG. 9 is a block diagram of an information processing device according to an exemplary embodiment of the present disclosure.

FIG. 9 is a block diagram of an information processing device according to the fourth embodiment of the present disclosure. The information processing device 720 stores, in a memory element 700, the second luminance profile data 330 generated using the thinning method in the information processing method according to the first or second embodiment. A luminance distribution calculator 710 outputs a luminance distribution calculation result 360 that is the luminance distribution of the entirety of the backlight device from the second luminance profile data 330 and light output levels 350 of the light sources.

Luminance Distribution Calculator

The luminance distribution calculator 710 multiplies the light output level of each light source and a value in a corresponding section of the luminance profile data in the backlight device. Each of the multiplied values corresponds to the intensity of the light reaching sections in the vicinity of a respective light source when the light sources are lit with their respective light output levels; therefore, the luminances of the sections of the luminance distribution of the entirety of the backlight device are calculated by summing the total intensity of the light reaching each section based on the multiplied values and the position information within the backlight device of the light sources, so that the luminances in the sections of the luminance distribution of the entirety of the backlight device are output as the luminance distribution calculation result 360 of the entirety of the backlight device.

In the example herein, in the second luminance profile data 330, the data in some of the sections is removed by the thinning processing; therefore, when referencing the data of such sections, the values of their surrounding sections in which the data is not removed in the thinning may be referenced instead, or numerical values may be estimated by performing calculations such as a linear interpolation, a function interpolation, etc., from the values of the surrounding sections in which the data is not removed in the thinning. Alternatively, the average value or the median value of the values of the surrounding sections in which the data is not removed in the thinning may be calculated instead. Also, in the luminance distribution calculation result 360, the data after the summing may be used as-is, or may be normalized to cause the maximum value after the summing to be 1.

FIG. 10 is a schematic diagram illustrating the second luminance profile data 450.

FIG. 11 is a schematic diagram illustrating a luminance profile data 810 on which interpolation by the luminance distribution calculator 710 is performed with reference to the second luminance profile data 450. As an example in FIG. 11, the average value of the values of the surrounding sections in which the data is not removed is calculated and used instead of the value of each of the sections in which the data has been removed in the thinning. The luminance profile data 810 is used in the calculation process of the luminance distribution calculator 710, and thus does not necessarily include a memory element for storing all of the data of the luminance profile data 810.

Fifth Embodiment

Figure 12:
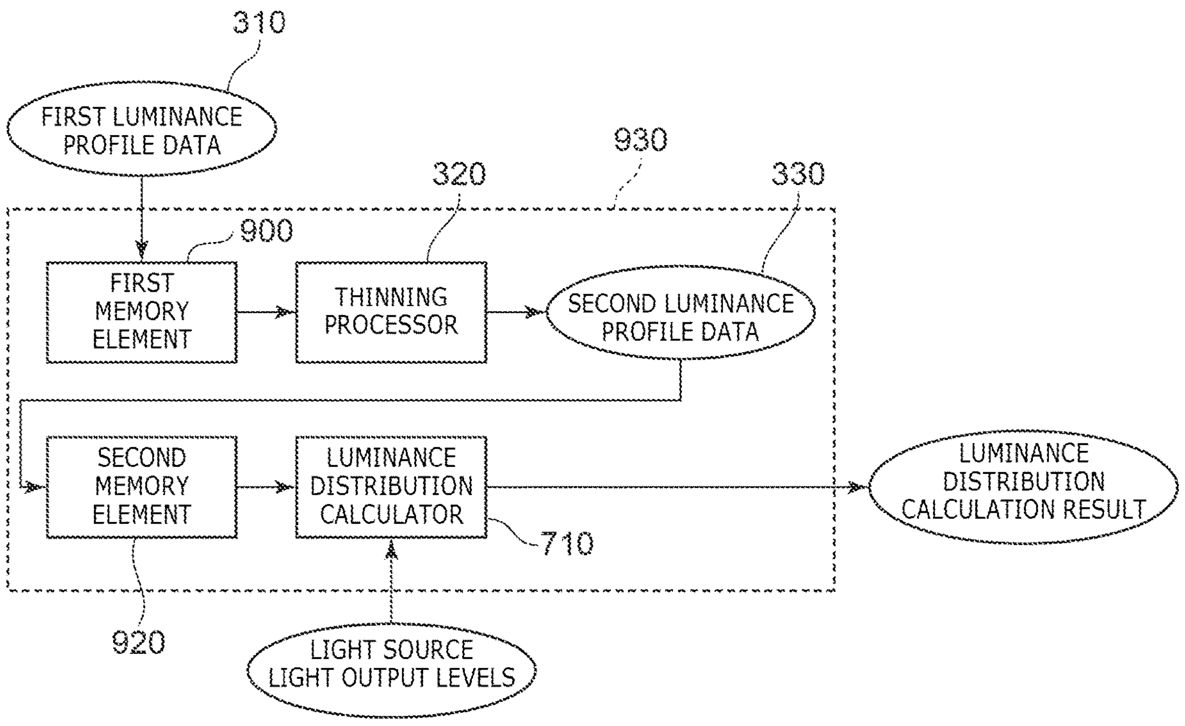
FIG. 12 is a block diagram to explain the information processing device according to an exemplary embodiment of the present disclosure.

FIG. 12 is a block diagram of an information processing device according to a fifth embodiment of the present disclosure. The information processing device according to the fifth embodiment includes the thinning processor 320 configured to thin the luminance profile data, in addition to configurations in the fourth embodiment. Other configurations in the fifth embodiment are similar to those in the fourth embodiment. According to the present embodiment, the first luminance profile data 310 is stored in a first memory element 900. The thinning processor 320 performs thinning using the thinning method of the information processing method according to the first or second embodiment with respect to the first luminance profile data 310, and stores the data after thinning in a second memory element 920 as the second luminance profile data 330.

Sixth Embodiment

In an image display device according to a sixth embodiment, both a backlight device and an image display element such as a liquid crystal panel and the like are controlled, and the image display result reflects a luminance distribution calculation performed using a device configures to calculate luminance distribution of the entirety of the backlight device as described in the fourth embodiment.

Figure 13:
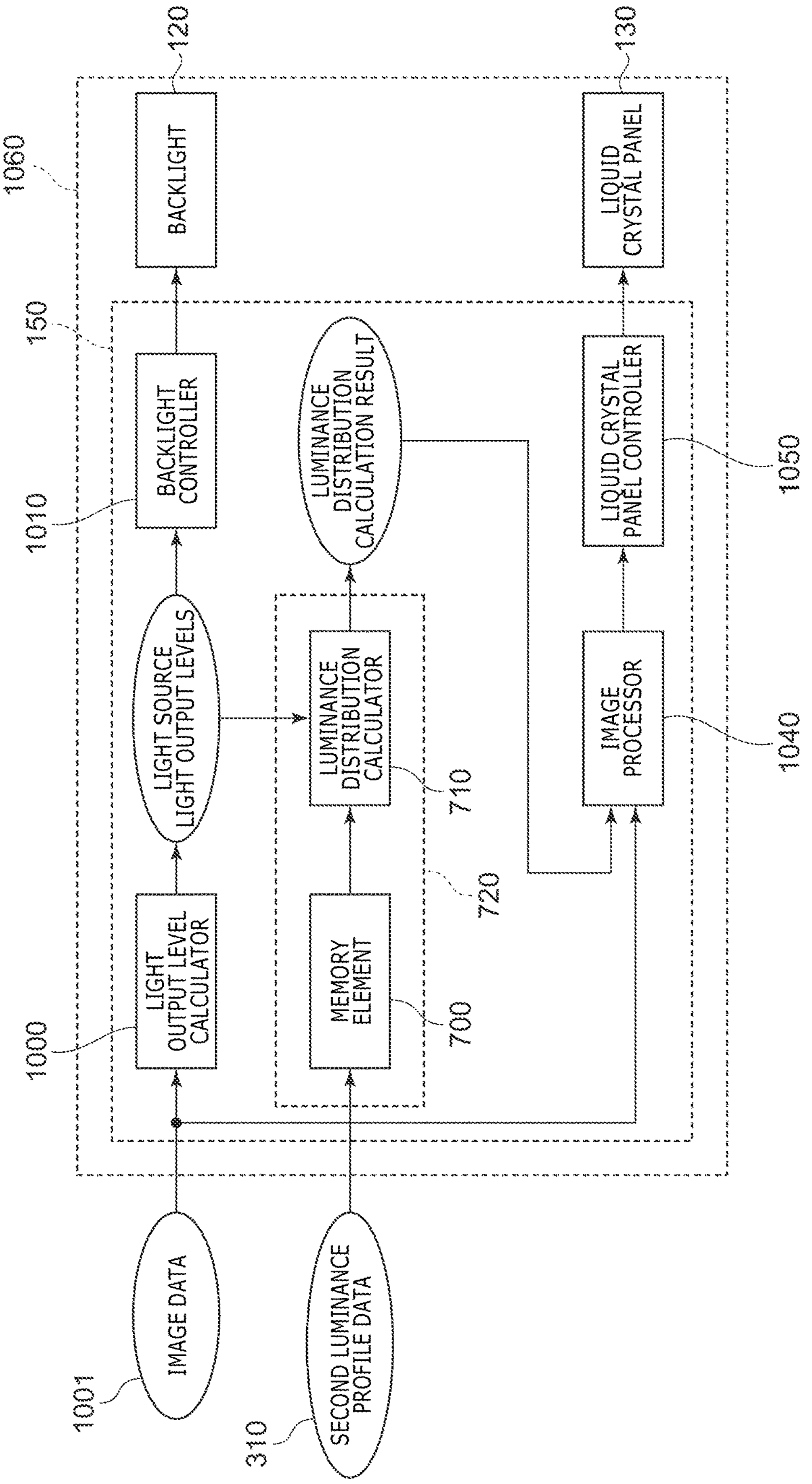
FIG. 13 is a block diagram to explain an image display device according to an exemplary embodiment of the present disclosure.

FIG. 13 is a schematic view of the image display device 1060 according to the sixth embodiment of the present disclosure. According to the present embodiment, the light output levels of the light sources are calculated in a light output level calculator 1000 of the controller 150 based on image data 1001 that is input. A backlight device controller 1010 is configured to control the brightnesses of the light sources by controlling the currents and voltages based on the calculated light output levels. An information processor 720 is an information processing device configured to calculate the luminance distribution of the entirety of the backlight device from the luminance profile data on which thinning processing such as that described above in reference to the fourth embodiment is performed. The luminance distribution calculator 710 is configured to calculate the luminance distribution of the entirety of the backlight device from the luminance profile data stored in the memory element 700 and from the light output levels of the light sources calculated by the light output level calculator 1000. The luminance profile data that is stored in the memory element 700 is the second luminance profile data on which the thinning processing of the information processing method according to the first or second embodiment is performed.

An image processor 1040 is configured to perform image processing based on the input image data 1001 and the calculation result of the luminance distribution calculator 710.

A liquid crystal panel controller 1050 is configured to control the transmittances of the pixels of the liquid crystal panel based on the image data after image processing, and displays the image in the liquid crystal panel. In the image display device, the backlight device and the liquid crystal panel overlap each other as illustrated in FIGS. 1A and 1B to display images. The components according to the sixth embodiment will be described below in more detail.

Light Output Level Calculator

The light output level calculator 1000 calculates the light output levels of light sources 1100 of the backlight device 120 that is located under the liquid crystal panel 130 for when the image is to be displayed in the liquid crystal panel 130. The image data 1001 that is input to the light output level calculator 1000 includes the gradation values of R, G, and B (red, green, and blue) that indicate the red-blue-green of each pixel. For example, the gradation value is represented by the 256 levels of 0 to 255.

Figure 14:
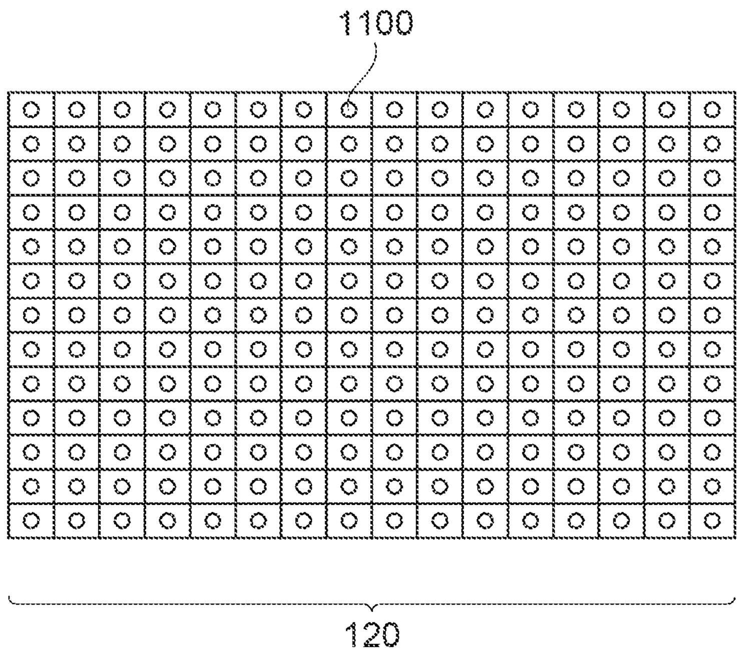
FIG. 14 is a schematic plan view illustrating an aspect of an arrangement of light sources of a back light.
Figure 15:
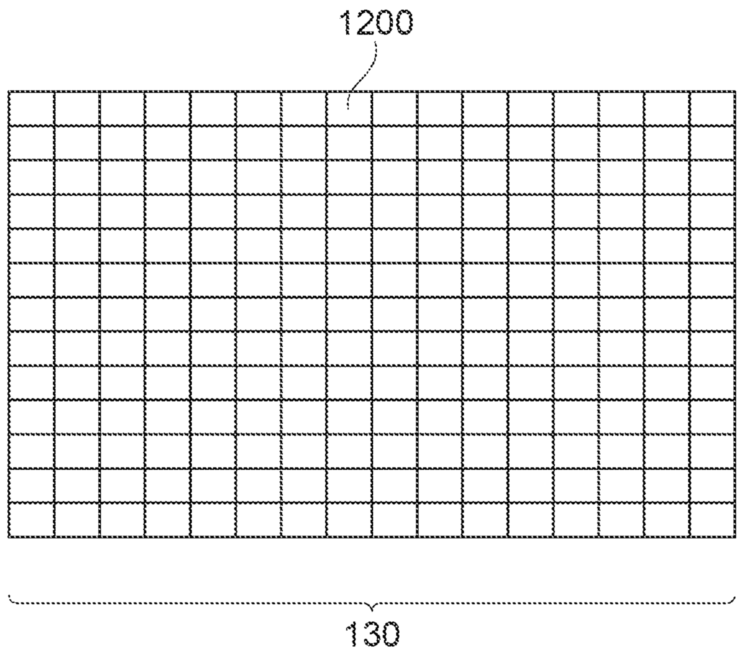
FIG. 15 is a schematic plan view illustrating an area division of a liquid crystal panel for light source positions in FIG. 9.

The calculation of the light output levels is performed by subdividing the pixels of the entire liquid crystal panel 130 into a plurality of pixel areas 1200 according to the arrangement of the light sources 1100 of the backlight device 120 as illustrated in FIGS. 14 and 15.

Figure 16:
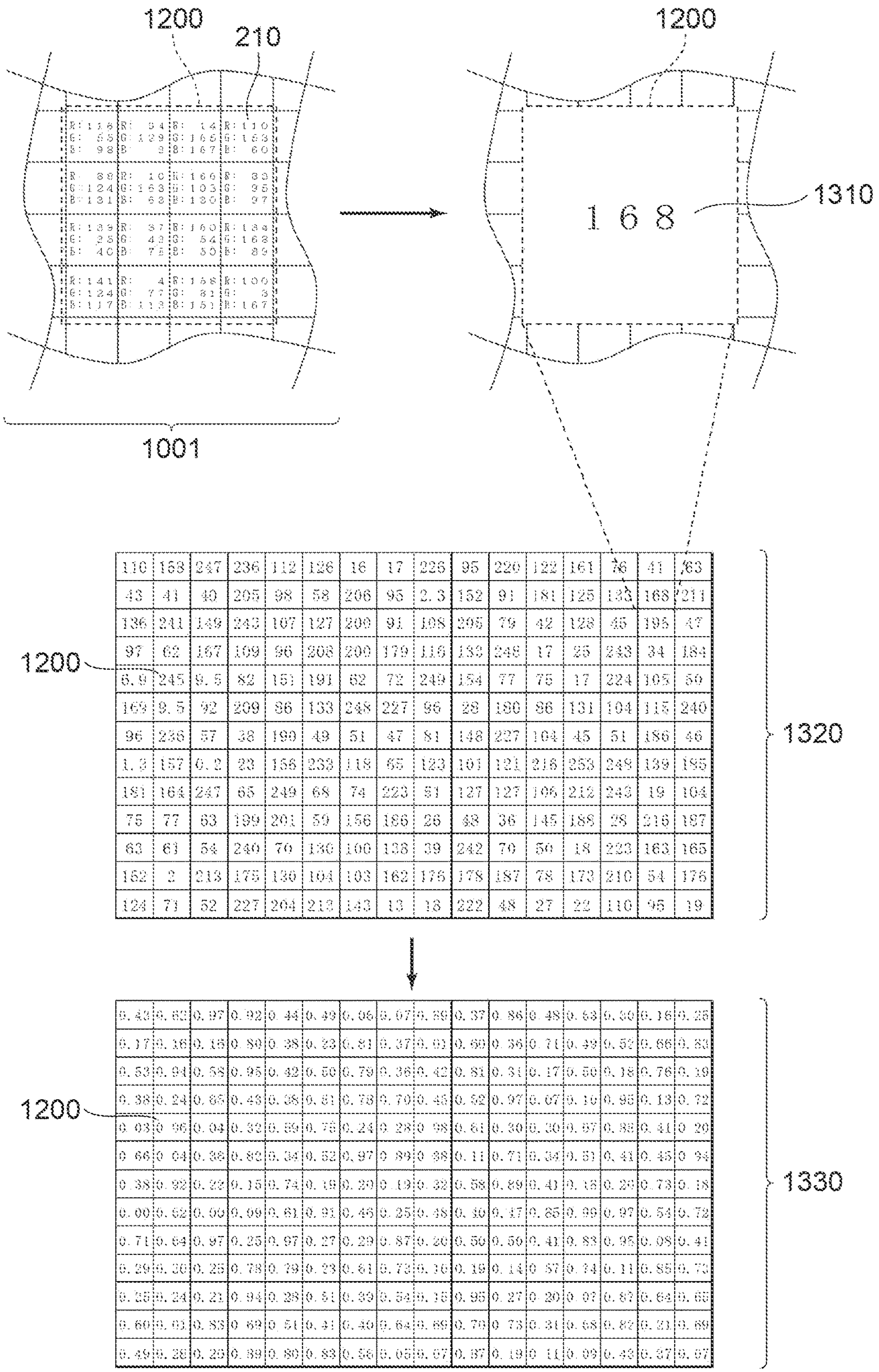
FIG. 16 is a mapping diagram to explain a calculation method of an optical output level in the image display device according to an exemplary embodiment of the present disclosure.

As illustrated in FIG. 16A, the gradation value that has the highest numerical value among the R, G, and B gradation values of the pixels in the pixel area 1200 of the liquid crystal panel above one light source is determined as a first light output level 1310 for the light source located under the pixel area 1200. First light output level data 1320 is thus generated by calculating the first light output levels for all of the plurality of pixel areas 1200; and second light output level data 1330 is generated by normalizing all of the values of the data of the first light output level data 1320 so that the highest value is 1. This normalization is performed for each pixel area according to Formula 1. As used herein, L1 represents the first light output level, L2 represents the second light output level, and Lmax represents the maximum value of the first light output level. For example, Lmax is 255 when the gradation value is represented by 0 to 255.

$$L_2 = L_1 \times \frac{1}{L_{max}} \tag{1}$$

Backlight Device Controller

The backlight device controller 1010 is configured to switch on the light sources of the backlight device by controlling the currents and voltages of the light sources 1100 based on the light output levels of the light sources calculated by the light output level calculator 1000. The current and voltage controls of the backlight device controller will be described below.

Current Control

Current control in the backlight device controller 1010 will be described using FIGS. 17A and 17B.

Figure 17A:
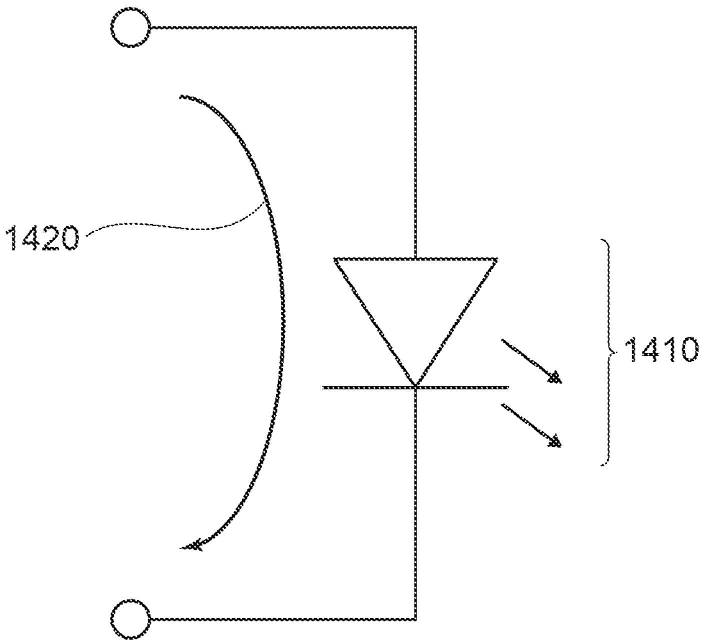
FIGS. 17A and 17B are explanation drawings to explain a backlight device control method in the image display device according to an exemplary embodiment of the present disclosure.
Figure 17B:
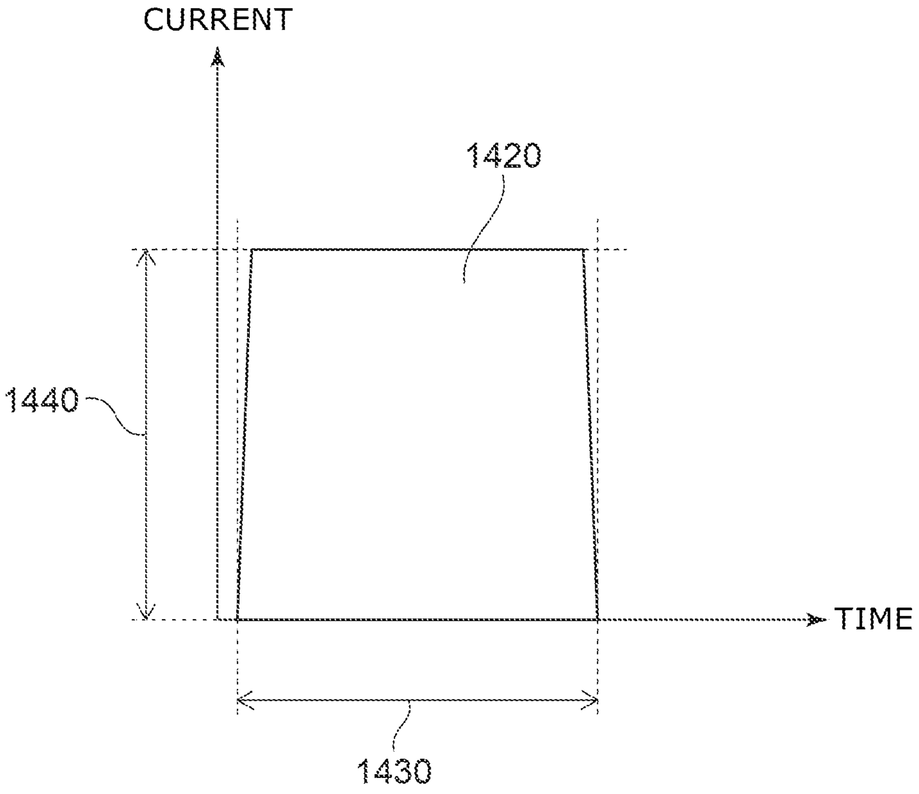

FIG. 17A is a schematic circuit diagram illustrating a light source 1410, and a current 1420 that flows in the light source 1410. FIG. 17B is a graph illustrating the temporal waveform (the solid line in the graph) of the current 1420. The backlight device controller 1010 is configured to control the intensity of the light irradiated from the light source 1410 by controlling one or both of a time 1430 that the current 1420 flows in the light source 1410 and a magnitude 1440 of the current.

Voltage Control

Figure 18A:
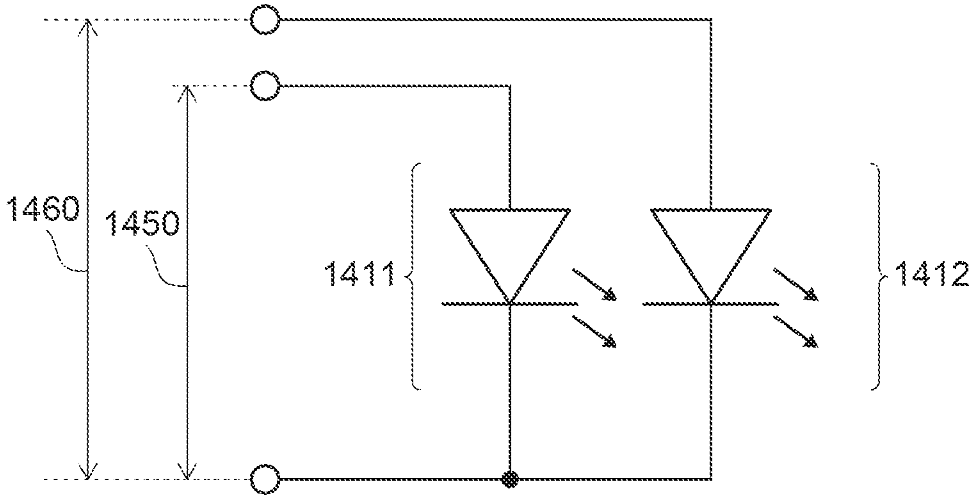
FIG. 18A is a schematic circuit diagram illustrating a connection between two light sources, and a voltage applied to each light source.

Voltage control in the backlight device controller 1010 will be described using FIGS. 18A and 18B. FIG. 18A is a schematic circuit diagram illustrating the connection between a light source 1411 and a light source 1412. The cathode sides of the light source 1411 and the light source 1412 are connected as a single interconnect.

Figure 18B:
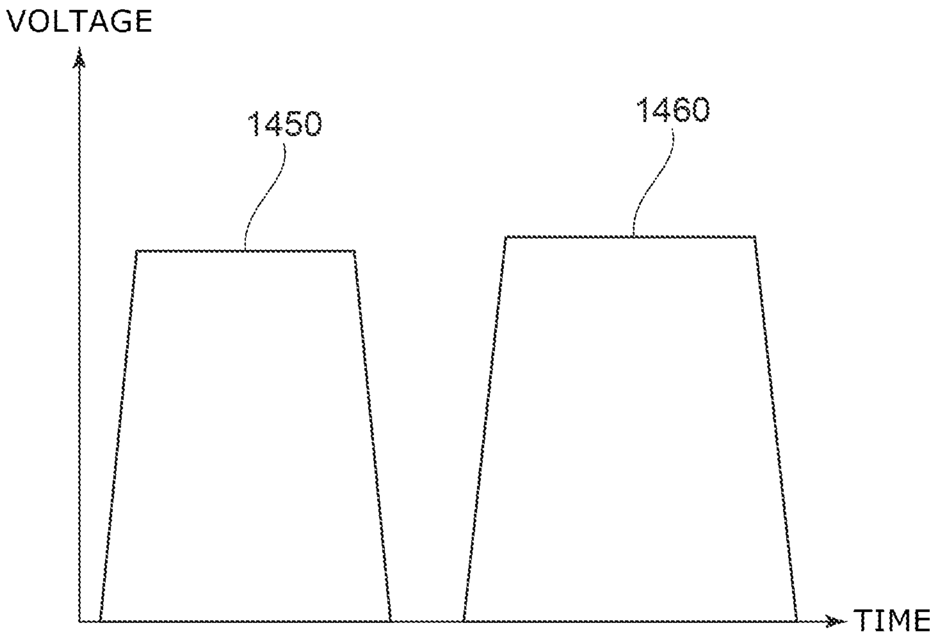
FIG. 18B is a graph illustrating temporal waveforms of the voltages applied to each of the two light sources.

FIG. 18B is a graph illustrating temporal waveforms of a voltage 1450 and a voltage 1460 applied between the anode and cathode of the light source 1411 and the light source 1412. The backlight device controller 1010 is configured to alternately switch the light sources 1411 and 1412 on by controlling the voltage 1450 and the voltage 1460 at shifted timing. Such a control is used to reduce the number of interconnects at the cathode side, etc. This connection is not limited to connecting only two light sources to a single cathode-side interconnect as shown in FIG. 18A; a plurality of light sources (such as three or more light sources) may be connected to a single cathode-side interconnect.

Information Processor

The information processor 720 is configured to perform information processing by using an information processing device such as that of the fourth embodiment. According to the sixth embodiment, the luminance distribution calculation result is normalized so that the maximum value is 1.

Image Processor

The image processor 1040 is configured to calculate the gradation values of the pixels R, G, and B to match the luminance levels from the backlight device irradiated on the pixels, based on the gradation values of the pixels R, G, and B of the image data 1001 and the luminance levels calculated by the luminance distribution calculator 710. The calculation according to Formula 2 is used to perform the calculation for each of R, G, or B of a single pixel. In Formula 2, $V_{out}$ represents the gradation value after calculation, $V_{in}$ represents the original gradation value, and $\gamma$ represents the $\gamma$ value of the liquid crystal panel displaying the image and is different for each liquid crystal panel. An example of the $\gamma$ value is $\gamma=2.2$. L represents the luminance level irradiated on each pixel in the luminance distribution calculation result and is represented by 0 to 1.

$$V_{out} = V_{in} \times \frac{1}{L1/\gamma} \tag{2}$$

Liquid Crystal Panel Controller

The liquid crystal panel controller 1050 controls the transmittances of the pixels of the liquid crystal panel based on the image data that is the result of calculation by the image processor 1040, and displays the image.

Seventh Embodiment

Figure 19:
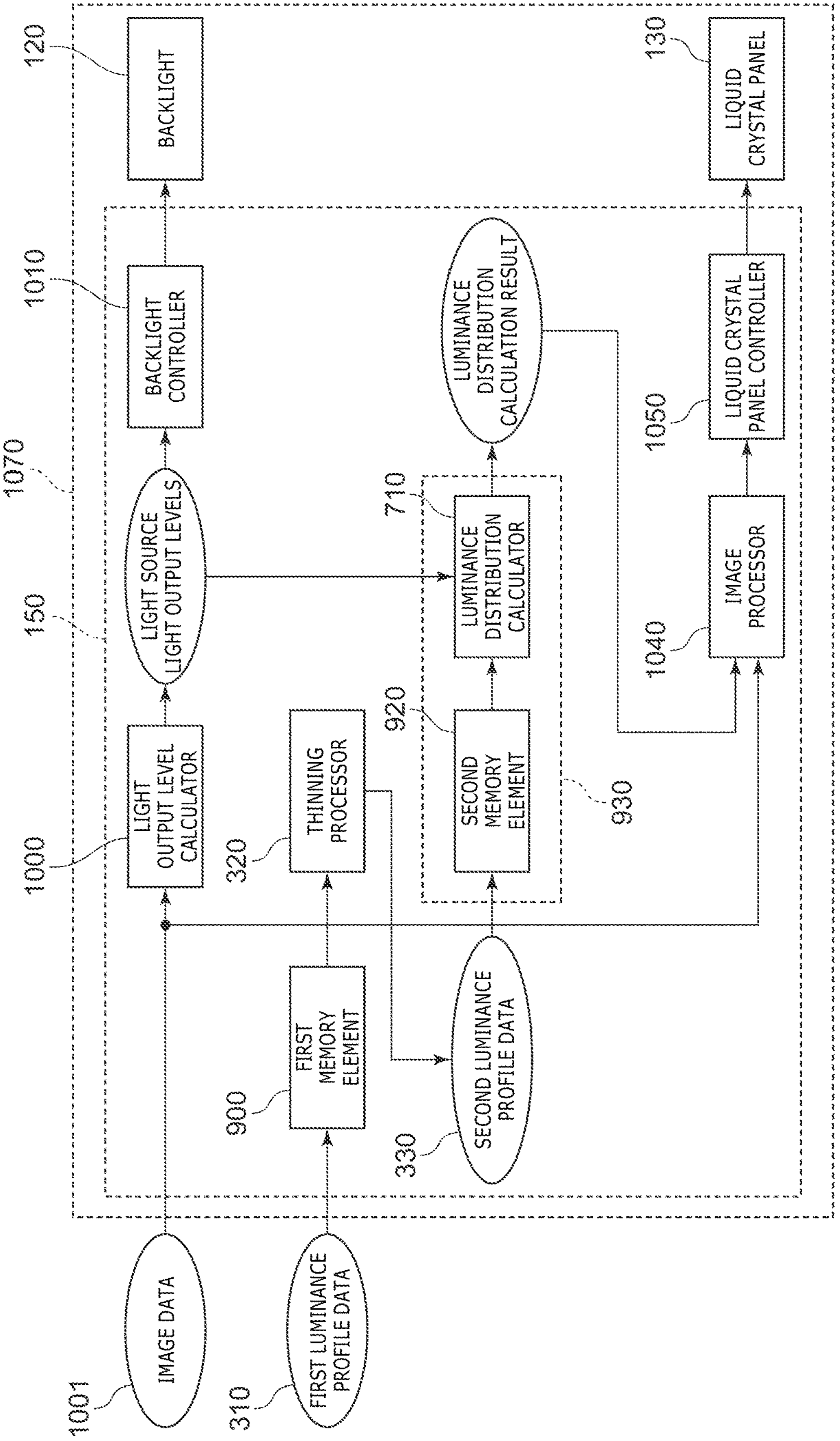
FIG. 19 is a block diagram to explain an image display device according to an exemplary embodiment of the present disclosure.

An image display device 1070 according to a seventh embodiment is different from that of the sixth embodiment in the information processor. As shown in FIG. 19, in an information processing device according to the seventh embodiment, an information processor 930 is configured to generate second luminance profile data from the first luminance profile data by performing thinning processing such as that of the fifth embodiment, and to calculate the luminance distribution of the entirety of the backlight device from the second luminance profile data. Other configurations in the seventh embodiment is similar to those in the sixth embodiment.

Certain embodiments of the present disclosure are described above. The present disclosure is not limited to these descriptions. Appropriate design modifications by one skilled in the art based on the embodiments described above also are within the scope of the present disclosure to the extent that the features of the present disclosure are included. For example, the contents, conditions, shapes, dimensions, material properties, arrangements, etc., of components and steps included in the information processing method, the information processing device, and the like, are not limited to those illustrated and can be modified as appropriate.

The components included in the embodiments described above can be combined within the limits of technical feasibility, and such combinations also are within the scope of the present disclosure to the extent that the gist of the present disclosure are included.

While the information processing method, the information processing program, the information processing device, and the image display device are described using the first to seventh embodiments as described above, the first luminance profile data is not limited to data such as that of FIGS. 2B, 2C, 4, 7A, and 8. Data such as a known batwing luminance profile, which is a known light distribution characteristic of the light source, or other various luminance profiles also can be used for the first luminance profile data.

Examples of the light source 110 included in the backlight device 120 include various components such as a light-emitting element, a component in which a light-emitting element is sealed with a sealing resin, a light-emitting device, a component in which a light-emitting device is sealed with a resin, a component that includes a light-emitting device and a secondary lens on the optical axis of the light-emitting device, etc.

A specific example of the light source will be described below.

Light-Emitting Device

A light-emitting device as a specific example of the light source will be described below. For the light source, a light-emitting device provided with a secondary lens on the optical axis of the light-emitting device as a single body can be used.

Figure 20A:
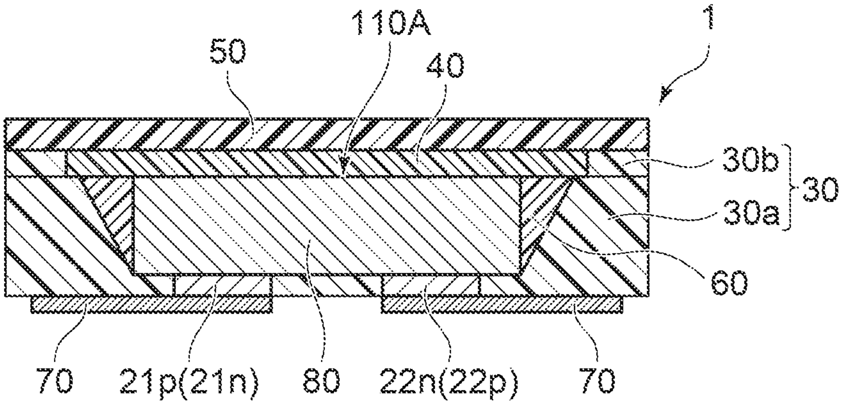
FIG. 20A is a schematic cross-sectional view of a light-emitting device according to an exemplary embodiment of the present disclosure.
Figure 20B:
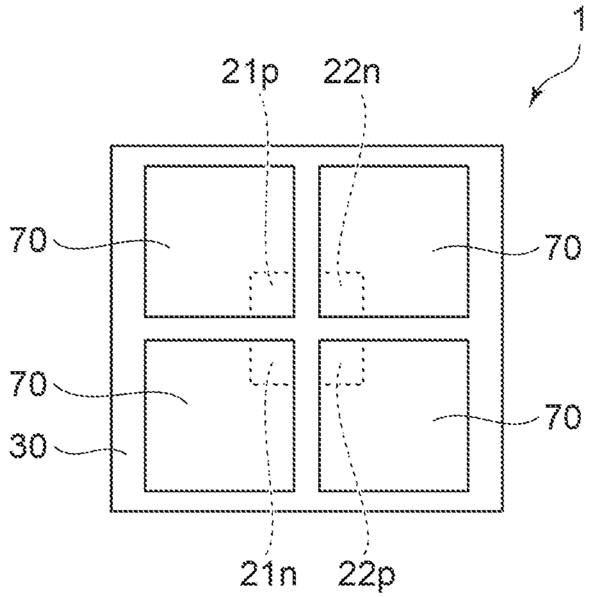
FIG. 20B is a schematic plan view of the light-emitting device shown in FIG. 20A when viewed from below.

FIG. 20A is a schematic cross-sectional view of the light-emitting device 1 according to one embodiment of the present disclosure. FIG. 20B is a schematic plan view of the light-emitting device 1 shown in FIG. 20A when viewed from below.

The light-emitting device 1 includes a light-emitting element 110A that includes a layered structure body 80 including a semiconductor layer and positive and negative electrodes (a p-side external electrode 21*p*, an n-side external electrode 21*n*, an n-side external electrode 22*n*, and a p-side external electrode 22*p*, which will be described below with reference to FIGS. 21 and 22) located at the lower surface of the layered structure body 80.

The light-emitting device 1 further includes a first light-transmissive member 40 disposed on an upper surface of the layered structure body 80 at a side opposite to the lower surface of the layered structure body 80, a first cover member 30*a* that covers lateral surfaces and the lower surface of the layered structure body 80 such that at least a portion of each of the electrodes 21*p*, 21*n*, 22*n*, and 22*p* is exposed, a second cover member 30*b* that covers lateral surfaces of the first light-transmissive member 40 and an upper surface of the first cover member 30*a*, a second light-transmissive member 50 that covers an upper surface of the first light-transmissive member 40 and an upper surface of the second cover member 30*b*, and a metal layer 70 that cover a surface of the first cover member 30*a* at a lower surface side of the light-emitting element 110A and is connected separately to the electrodes 21*p*, 21*n*, 22*n*, and 22*p*.

The first light-transmissive member 40 may include a resin, and may include a resin containing a fluorescent substance. For the resin, at least one of a silicone resin, an epoxy resin, a phenol resin, a polycarbonate resin, an acrylic resin, a TPX resin, a polynorbornene resin, a modified resin of these resins, or a hybrid resin of these resins can be used.

The fluorescent substance absorbs at least a portion of the primary light emitted from the light-emitting element 110A and emits secondary light of a different wavelength from the primary light. Accordingly, the light-emitting device 1 can be configured to emit mixed light (e.g., white light) of the primary and secondary light that has a visible wavelength. The fluorescent substance can include one of the specific examples described below singly or a combination of two or more of the specific examples described below. Specific examples of the fluorescent substances include an yttrium-aluminum-garnet-based phosphor (e.g., $Y_3(Al, Ga)_5O_{12}$:Ce), a lutetium-aluminum-garnet-based phosphor (e.g., $Lu_3(Al, Ga)_6O_{12}$:Ce), a silicate-based phosphor (e.g., $(Ba, Sr)_2SiO_4$:Eu), a chlorosilicate-based phosphor (e.g., $Ca_8Mg(SiO_4)_4C_{12}$:Eu), a β-sialon-based phosphor (e.g., $Si_{6-Z}Al_ZO_ZN_{8-Z}$:Eu ($0<Z<4.2$)), a nitrogen-including calcium aluminosilicate (CASN or SCASN)-based phosphor (e.g., $(Sr, Ca)AlSiN_3$:Eu), a potassium fluorosilicate-based phosphor (e.g., $K_2SiF_6$:Mn), etc. The fluorescent substance may include quantum dots. Quantum dots are particles having particle sizes of approximately 1 nm or greater and 100 nm or less, and can have various light emission wavelength according to the particle size. Examples of quantum dots include cadmium selenide, cadmium telluride, zinc sulfide, cadmium sulfide, lead sulfide, lead selenide, cadmium telluride-mercury, etc.

In the first light-transmissive member 40, the fluorescent substance may be diffused in the entirety, or may be predominantly dispersed at the light-emitting element 110A side. When the fluorescent substance is predominantly dispersed at the light-emitting element 110A side, a method in which a resin containing the fluorescent substance is disposed by potting, and the fluorescent substance is caused to settle by its own weight or by applying a centrifugal force.

The first light-transmissive member 40 can be obtained by providing an intermediate body in which the first light-transmissive member 40 and the second cover member 30*b* are formed in a single body and by bonding the intermediate body to the upper surface of the light-emitting element 110A and the upper surface of the first cover member 30*a* at a side of the lateral surfaces of the light-emitting element 110A.

The first cover member 30*a* and the second cover member 30*b* contain at least a resin as a base material, preferably contain a white pigment in the base material, and optionally contain a filler. For the base material of the first cover member 30*a* and the second cover member 30*b*, a thermosetting resin or a thermoplastic resin can be used. For the thermosetting resin, at least one of a silicone resin, an epoxy resin, a polyimide resin, a polybismaleimide triazine resin, an unsaturated polyester resin, a modified resin of these resins, or a hybrid resin of these resins can be used. For the thermoplastic resin, at least one of an aliphatic polyamide resin, a semi-aromatic polyamide resin, polycyclohexylenedimethylene terephthalate, polyethylene terephthalate, polycyclohexane terephthalate, a liquid crystal polymer, a polycarbonate resin, a modified resin of these resins, or a hybrid resin of these resins can be used. Examples of the white pigment include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, etc. For the white pigment, one of these substances can be used singly, or a combination of two or more of these substances can be used. The first cover member 30*a* and the second cover member 30*b* may be integrally formed as a cover member 30.

The light-emitting device 1 may further include a light guide member 60 at the lateral surfaces of the light-emitting element 110A. The light guide member 60 contacts the side surface of the light-emitting element 110A and covers the periphery of the light-emitting element 110A. The light guide member 60 is covered with the cover member 30; and an upper surface of the light guide member 60 is covered with the first light-transmissive member 40. With this structure, light emitted from a lateral surface of the light-emitting element 110A can be guided toward the first light-transmissive member 40.

The second light-transmissive member 50 may include a resin. For example, a resin that contains a light-diffusing agent such as titanium oxide, which is a typical example of the light-diffusing agent, can be used for the second light-transmissive member 50. For the resin, at least one of a silicone resin, an epoxy resin, a phenol resin, a polycarbonate resin, an acrylic resin, a TPX resin, a polynorbornene resin, a modified resin of these resins, or a hybrid resin of these resins can be used. For example, the second light-transmitting member 50 can be formed by spraying a mixture including a material of the second light-transmissive member 50 and a volatile solvent onto the first light-transmissive member 40 and the cover member 30 using a pulse spray device and then performing curing.

Light-Emitting Element

Figure 21:
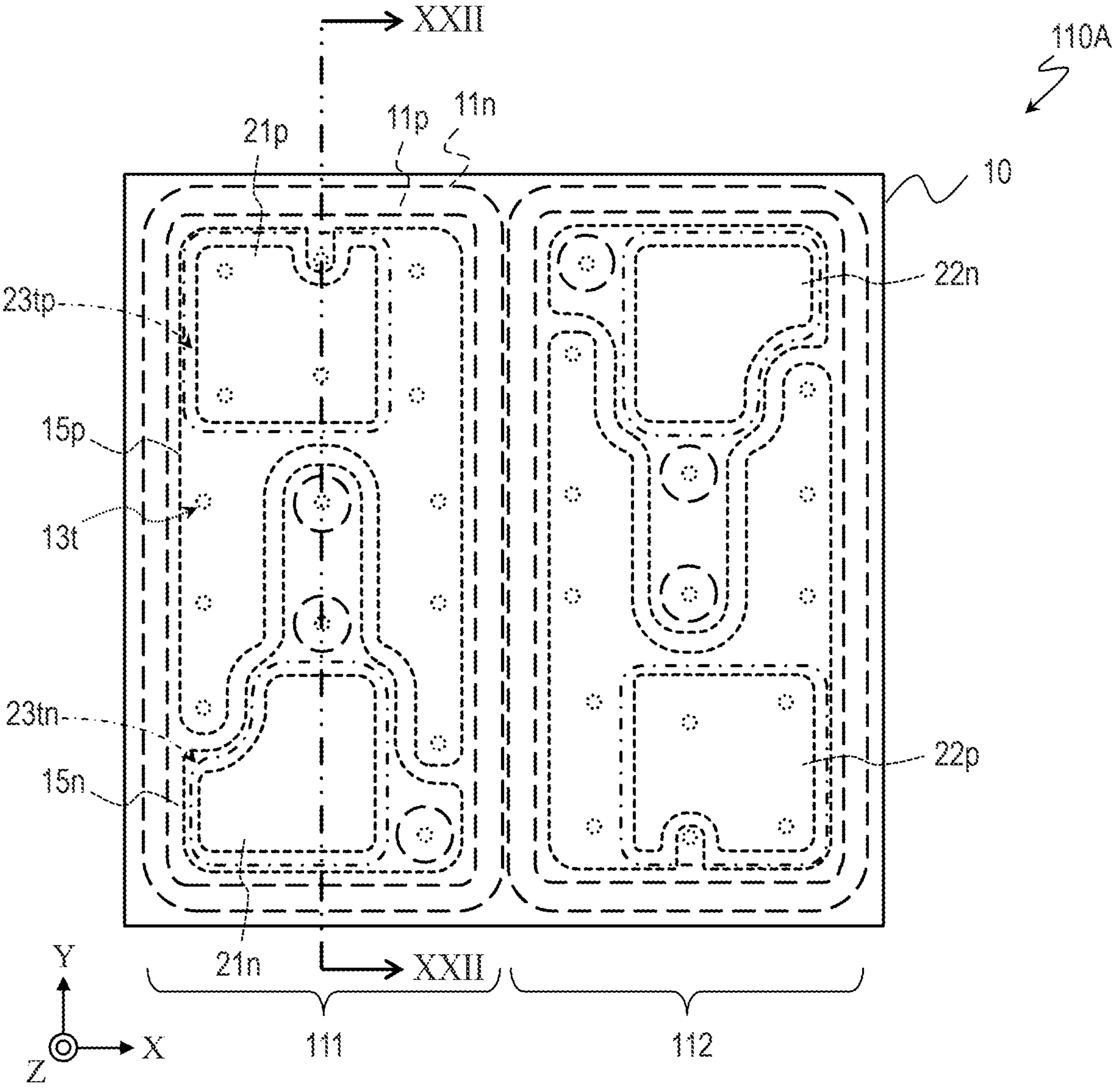
FIG. 21 is a schematic plan view of a light-emitting element according to an exemplary embodiment of the present disclosure.

FIG. 21 is a schematic plan view of the light-emitting element 110A. FIG. 22 schematically shows a cross section when the light-emitting element 110A is cut parallel to the YZ plane of FIG. 21. The cross section shown in FIG. 22 corresponds to a XXII-XXII cross section of FIG. 21.

The light-emitting element 110A according to an example has a plurality of semiconductor light-emitting structures that are electrically separate from each other. In the configuration illustrated in FIG. 21, the light-emitting element 110A includes a light-transmissive substrate 10, a first light-emitting cell 111 (a first semiconductor light-emitting structure 111) and a second light-emitting cell 112 (a second semiconductor light-emitting structure 112). The light-transmissive substrate 10 includes an upper surface 10*a* that forms the upper surface of the light-emitting element 110A, and a lower surface 10*b* that is positioned at a side opposite to the upper surface 10*a*. As schematically shown in FIG. 22, the first light-emitting cell 111 is located on the lower surface 10*b* of the light-transmissive substrate 10; similarly, the second light-emitting cell 112 is located on the lower surface 10*b* of the light-transmissive substrate 10.

Each of the first light-emitting cell 111 and the second light-emitting cell 112 may have a structure similar to a known semiconductor light-emitting element such as an LED (light-emitting diode), etc. In the example herein, each of the first and second light-emitting cells 111 and 112 partially include a structure in which an n-type semiconductor layer 11*n*, an active layer 11*e*, and a p-type semiconductor layer 11*p* are layered in this order from the light-transmissive substrate 10 side. In the description below, details of the configuration will be described with a focus on the first light-emitting cell 111, and a description of the details of the configuration of the second light-emitting cell 112 will be omitted.

The first light-emitting cell 111 includes the n-type semiconductor layer 11*n* on the lower surface 10*b* of the light-transmissive substrate 10, and the active layer 11*e* and the p-type semiconductor layer 11*p* that are disposed above a portion of the n-type semiconductor layer 11*n*. For example, the peak wavelengths of light generated from the active layer of the first light-emitting cell 111 and the active layer of the second light-emitting cell 112 are 360 nm or greater and 650 nm or less. These light-emitting cells may contain a nitride semiconductor ($In_xAl_yGa_{1-x-y}N$, $0 \leq x$, $0 \leq y$, and $x+y \leq 1$) capable of emitting light in the ultraviolet to visible region. The light-transmissive substrate 10 supports the first light-emitting cell 111 and the second light-emitting cell 112. The light-transmissive substrate 10 may be a substrate typified by a sapphire substrate or a gallium nitride substrate.

Each light-emitting cell on the light-transmissive substrate 10 further includes one or more insulating layers and electrodes. For example, as shown in FIG. 22, the first light-emitting cell 111 further includes: a first insulating film 13 that covers the layered structure of the n-type semiconductor layer 11*n*, the active layer 11*e*, and the p-type semiconductor layer 11*p*; an n-side internal electrode 15*n* and a p-side internal electrode 15*p* that are disposed on the first insulating film 13; a second insulating film 23 that covers the n-side internal electrode 15*n* and the p-side internal electrode 15*p*; and the n-side external electrode 21*n* and the p-side external electrode 21*p* that are disposed on the second insulating film 23.

The first insulating film 13 is made of an oxide or a nitride containing at least one selected from the group consisting of Si, Ti, Zr, Nb, Ta, Al, and Hf, and continuously covers the first light-emitting cell 111 and the second light-emitting cell 112. A multilayer film in which $SiO_2$ and $Nb_2O_5$ are repeatedly layered can be also employed for the first insulating film 13.

A plurality of first through-holes 13*t* are formed in the first insulating film 13; and the n-side internal electrode 15*n* and the p-side internal electrode 15*p*, which are described below, are electrically connected respectively to the n-type and p-type semiconductor layers 11*n* and 11*p* via respective first through-holes 13*t*. In the example herein, fifteen first through-holes 13*t* are formed in portions of the first insulating film 13 overlapping the first light-emitting cell 111.

The n-side internal electrode 15*n* and the p-side internal electrode 15*p* are disposed on the first insulating film 13 and are electrically connected respectively to the n-type and p-type semiconductor layers 11*n* and 11*p*. The n-side internal electrode 15*n* and the p-side internal electrode 15*p* are made of a metal or an alloy having high light reflectivity and conductivity such as Al, Ag, an Al alloy, a Ag alloy, etc. A layered film in which Ti, Rh, and Ti are deposited in this order may be used for the n-side and p-side internal electrodes 15*n* and 15*p*.

The second insulating film 23 continuously covers the first insulating film 13, the n-side internal electrode 15*n*, and the p-side internal electrode 15*p*. The second insulating film 23 defines a second through-hole 23*tn* at a location overlapping the n-side internal electrode 15*n*. The n-side external electrode 21*n*, which will be described below, is electrically connected to the n-side internal electrode 15*n* via the second through-hole 23*tn*. A third through-hole 23*tp* is formed in the second insulating film 23 at a location overlapping the p-side internal electrode 15*p*; and the p-side external electrode 21*p*, which will be described below, is electrically connected to the p-side internal electrode 15*p* via the third through-hole 23*tp*. A material that is the same as a material of the first insulating film 13, such as $SiO_2$, etc., can be used as a material of the second insulating film 23.

Figure 22:
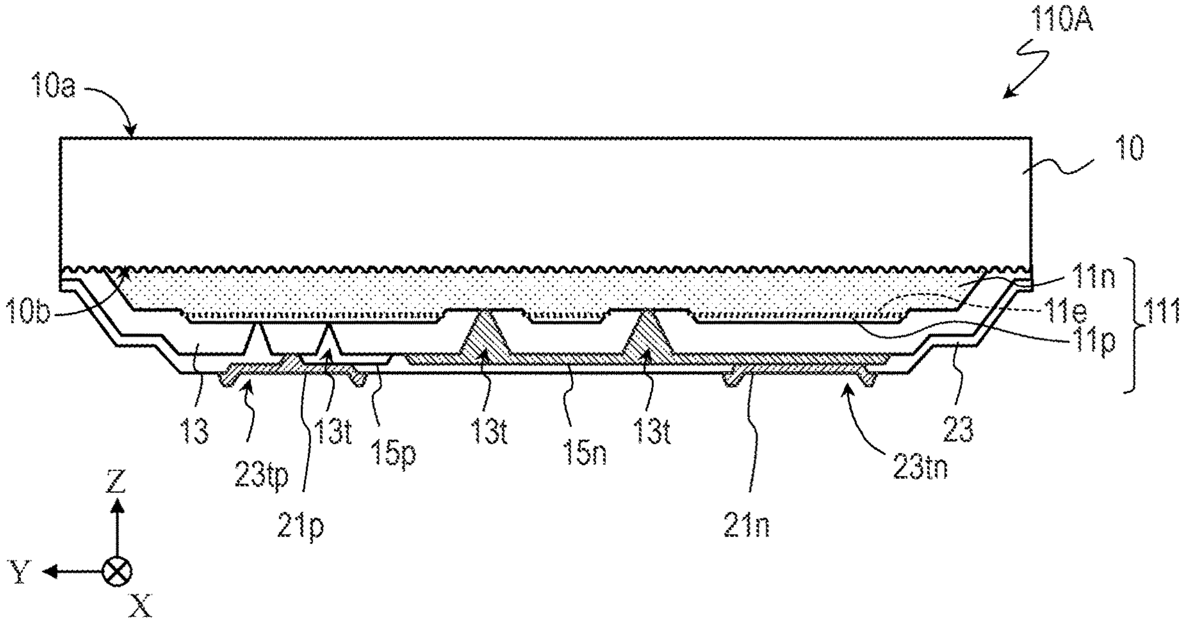
FIG. 22 is a cross-sectional view taken along line XXII-XXII of FIG. 21.

As schematically shown in FIG. 22, the n-side external electrode 21*n* is located on the second insulating film 23 and is electrically connected to the n-side internal electrode 15*n* via the second through-hole 23*tn* of the second insulating film 23. Similarly, the p-side external electrode 21*p* is located on the second insulating film 23 and is electrically connected to the p-side internal electrode 15*p* via the third through-hole 23*tp* of the second insulating film 23.

As shown in FIG. 21, the second light-emitting cell 112 includes the n-side external electrode 22*n* that is electrically connected to the n-type semiconductor layer of the second light-emitting cell 112 and the p-side external electrode 22*p* that is electrically connected to the p-type semiconductor layer of the second light-emitting cell 112 at the upper surface of the light-emitting element 110A, i.e., the side opposite to the upper surface 10*a* of the light-transmissive substrate 10. That is, the light-emitting element 110A includes the first light-emitting cell 111 and the second light-emitting cell 112 that are configured to be driven separately from each other when connected to a power supply, etc.

For example, the n-side external electrode 21*n* and the p-side external electrode 21*p* of the first light-emitting cell 111 and the n-side external electrode 22*n* and the p-side external electrode 22*p* of the second light-emitting cell 112 are disposed by plating and may have a layered structure of two or more layers including a first layer as a seed layer and a second layer on the first layer. A metal or an alloy that has high light reflectivity and conductivity such as Al, Ag, an Al alloy, a Ag alloy, etc., can be used for a material of the first layer. Typical examples of the material of the second layer include Cu, Au, and Ni. A layered film in which Ti, Ni, and Al are deposited in this order from the light-transmissive substrate 10 side may be used as the n-side external electrode 21*n*, the p-side external electrode 21*p*, the n-side external electrode 22*n*, and the p-side external electrode 22*p*.

As shown in FIG. 21, the light-emitting element 110A includes, for example, two positive electrodes (the p-side external electrode 21*p* and the p-side external electrode 22*p*) and two negative electrodes (the n-side external electrode 21*n* and the n-side external electrode 22*n*). The n-side external electrode 21*n*, the p-side external electrode 21*p*, the n-side external electrode 22*n*, and the p-side external electrode 22*p* shown in FIG. 21 are simply and schematically illustrated as squares in FIG. 20B.

As shown in FIG. 20B, the metal layer 70 is disposed on a surface of the cover member 30 at the lower surface side of the light-emitting element 110A. For example, the metal layer 70 are constituted of four portions that are separated from each other, each of the four portions being connected to a respective one of the n-side external electrode 21_n_, the p-side external electrode 21_p_, the n-side external electrode 22_n_, and the p-side external electrode 22_p_ of the light-emitting element 110A.

The metal layer 70 can be formed in the manner as will be described below. The metal layer 70 is disposed to continuously cover surfaces of the n-side external electrode 21_n_, the p-side external electrode 21_p_, the n-side external electrode 22_n_, the p-side external electrode 22_p_, and the cover member 30. The metal layer 70 can be disposed by sputtering, vapor deposition, atomic layer deposition (ALD), metal-organic chemical vapor deposition (MOCVD), plasma-enhanced chemical vapor deposition (PECVD)), atmospheric plasma film formation, plating, etc. Then, laser light is irradiated on the metal layer 70; and the metal layer 70 is removed in the irradiated regions by laser ablation. This causes a portion of the cover member 30 between the positive and negative electrodes of the light-emitting element 110A to be exposed, so that the metal layers 70 are obtained.

The metal layer 70 may be constituted of only one layer of a single material, or may be constituted of a layered structure including layers of different materials. In particular, a metal having a high melting point is preferably used for the metal layer 70; for example, Ru, Mo, Ta, etc., can be used. Also, when such a high melting-point metal is disposed between an outermost layer and the electrodes 21_p_, 21_n_, 22_n_, and 22_p_ of the light-emitting element 110A, the high melting-point metal can serve as a diffusion prevention layer that can reduce diffusion of Sn that is contained in the solder into the electrodes 21_p_, 21_n_, 22_n_, and 22_p_ and layers proximate to the electrodes 21_p_, 21_n_, 22_n_, and 22_p_. Ni/Ru/Au, Ti/Pt/Au, etc., are examples of layered structures including such a diffusion prevention layer. It is preferable that the diffusion prevention layer (e.g., Ru) has a thickness of approximately 10 Å or greater and 1000 Å or less.

What is claimed is:

1. An information processing method, comprising:

inputting first luminance profile data of spreading of light when one light source of a backlight device including at least one light source is lit; and thinning by reducing a data amount of values of the first luminance profile data with adjustment of a thin-out spacing according to positions in a luminance distribution of the at least one light source based on the first luminance profile data to generate second luminance profile data, wherein the luminance distribution based on the first luminance profile data is divided into at least a first region, a second region, and a third region, a spatial luminance variation in the first region is larger than a spatial luminance variation in the second region and a spatial luminance variation in the third region, the spatial luminance variation in the third region is smaller than the spatial luminance variation in the second region, the thinning is not performed in the first region, a ratio of a data amount after the thinning in the second region to a data amount before the thinning in the second region is larger than a ratio of a data amount after the thinning in the third region to a data amount before the thinning in the third region.

2. An information processing device, comprising:

a memory element storing second luminance profile data generated by the information processing method according to claim 1; and a luminance distribution calculator configured to calculate a luminance distribution of an entirety of the backlight device when one or more light sources arranged in a backlight device are lit at respective positions and with respective light output levels of the one or more light sources, the calculating being performed with reference to values of the second luminance profile data stored in the memory element.

3. An image display device, comprising:

a backlight device including one or more light sources;

a backlight device controller configured to control a brightness of the one or more light sources;

a liquid crystal panel configured to display an image;

a liquid crystal panel controller configured to control transmittances of pixels of the liquid crystal panel;

a light output level calculator configured to calculate a light output level of each of the one or more light sources from image data;

a luminance distribution calculator being the information processing device according to claim 2 and configured to calculate luminance distribution data at each position of the one or more light sources from the second luminance profile data and the light output levels; and an image processor configured to calculate transmittances of the pixels of the liquid crystal panel from a result of a calculation by the luminance distribution calculator.

4. An information processing device, comprising:

a first memory element storing first luminance profile data, the first luminance profile data being of spreading of light when one light source of one or more light sources of a backlight device is lit;

an information processor configured to generate second luminance profile data from values of the first luminance profile data using the information processing method according to claim 1;

a second memory element storing the second luminance profile data; and a luminance distribution calculator configured to calculate a luminance distribution of an entirety of the backlight device when the one or more light sources arranged in the backlight device is lit at respective positions and with respective light output levels of the one or more light sources, the calculating being performed with reference to values of the second luminance profile data stored in the second memory element.

5. An image display device, comprising:

a backlight device including one or more light sources;

a backlight device controller configured to control a brightness of the one or more light sources;

a liquid crystal panel configured to display an image;

a liquid crystal panel controller configured to control transmittances of pixels of the liquid crystal panel;

a light output level calculator configured to calculate a light output level of each of the one or more light sources from image data;

a luminance distribution calculator being the information processing device according to claim 4 and configured to calculate luminance distribution data at each position of the one or more light sources from the second luminance profile data and the light output levels; and an image processor configured to calculate transmittances of the pixels of the liquid crystal panel from a result of a calculation by the luminance distribution calculator.

6. The information processing method according to claim 1, wherein the luminance distribution based on the first luminance profile data further includes a fourth region, the third region and the fourth region are adjacent to each other outside the second region in the luminance distribution, the thin-out spacing in the third region is smaller than a thin-out spacing in the fourth region.

7. An information processing method, comprising:

inputting first luminance profile data of spreading of light when one light source of a backlight device including at least one light source is lit; and thinning by reducing a data amount of values of the first luminance profile data with adjustment of a thin-out spacing according to positions in a luminance distribution of the at least one light source based on the first luminance profile data to generate second luminance profile data, wherein the first luminance profile data is divided into at least a first region, a second region, and a third region, the first region includes a portion having a highest luminance in the first luminance profile data, a distance of the second region from the first region is less than a distance of the third region from the first region, the thinning is not performed in the first region, a ratio of a data amount after the thinning in the second region to a data amount before the thinning in the second region is larger than a ratio of a data amount after the thinning in the third region to a data amount before the thinning in the third region.

* * * * *